United States Patent
Kitabatake et al.

(10) Patent No.: US 11,163,503 B2
(45) Date of Patent: Nov. 2, 2021

(54) CONTROL METHOD, IMAGE PROCESSING APPARATUS, AND NON-TRANSITORY COMPUTER-READABLE STORAGE MEDIUM

(71) Applicant: CANON KABUSHIKI KAISHA, Tokyo (JP)

(72) Inventors: Nobuhiro Kitabatake, Tokyo (JP); Mizuki Hayakawa, Kawasaki (JP); Takayuki Yamada, Kawasaki (JP); Hiroyasu Kunieda, Yokohama (JP); Shinjiro Hori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/986,754

(22) Filed: Aug. 6, 2020

(65) Prior Publication Data

US 2021/0042066 A1      Feb. 11, 2021

(30) Foreign Application Priority Data

Aug. 8, 2019   (JP) .............................. JP2019-146638

(51) Int. Cl.
*G06F 3/12* (2006.01)
(52) U.S. Cl.
CPC ............ *G06F 3/1208* (2013.01); *G06F 3/125* (2013.01); *G06F 3/1243* (2013.01); *G06F 3/1253* (2013.01)

(58) Field of Classification Search
CPC ...... G06F 3/1208; G06F 3/1243; G06F 3/125; G06F 3/1253; H04N 1/00167; H04N 1/00132; H04N 1/0019
See application file for complete search history.

(56) References Cited

U.S. PATENT DOCUMENTS

| | | | |
|---|---|---|---|
| 2013/0124980 A1* | 5/2013 | Hudson | G06F 40/10 715/243 |
| 2016/0139761 A1* | 5/2016 | Grosz | G06F 3/0482 715/769 |
| 2017/0186201 A1* | 6/2017 | Obayashi | H04N 1/00442 |
| 2019/0102926 A1 | 4/2019 | Obayashi | |

FOREIGN PATENT DOCUMENTS

| | | |
|---|---|---|
| EP | 3333804 A1 | 6/2018 |
| JP | 2017117406 A | 6/2017 |
| WO | 2010/151255 A1 | 12/2010 |

* cited by examiner

*Primary Examiner* — Iriana Cruz
(74) *Attorney, Agent, or Firm* — Canon U.S.A., Inc. IP Division

(57) ABSTRACT

A method for controlling an image processing apparatus including specifying one or a plurality of pieces of image data; generating a new template based on a feature of the specified one or plurality of pieces of image data, the generated new template including at least one or a plurality of slots for which the specified one or plurality of pieces of image data are laid out; and generating a layout image by laying out the specified one or plurality of pieces of image data to the one or plurality of slots included in the generated new template.

17 Claims, 18 Drawing Sheets

TEMPLATE L    TEMPLATE R

TEMPLATE L

TEMPLATE L

TEMPLATE L

TEMPLATE L

FIXED SLOT    AUTOMATIC LAYOUT SLOT

TEMPLATE L

FIG.14A
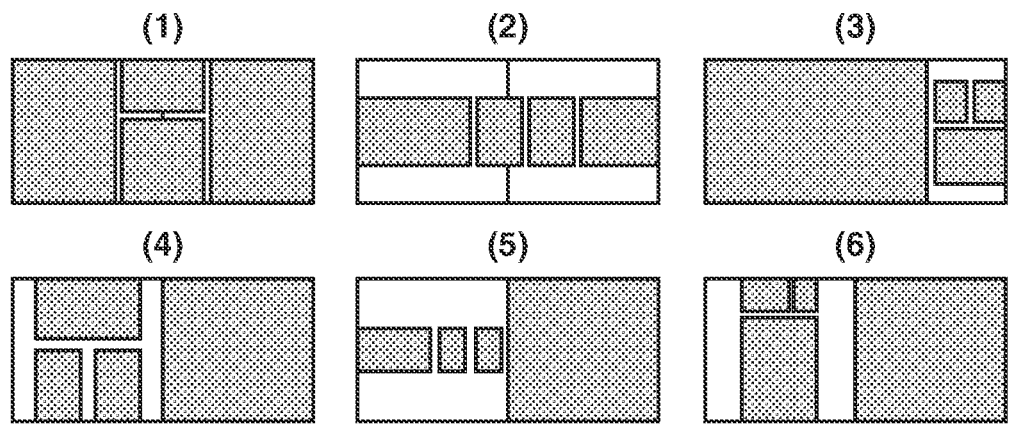
FIG.14B
| TEMPLATE | SCOREa | SCOREg | TEMPLATE SCORE |
|---|---|---|---|
| (1) | 1 | 1 | 1 |
| (2) | 0 | 1 | 0.5 |
| (3) | 1 | 0.4 | 0.7 |
| (4) | 1 | 1 | 1 |
| (5) | 0.4 | 0.6 | 0.5 |
| (6) | 0.8 | 0 | 0.4 |
FIG.14C
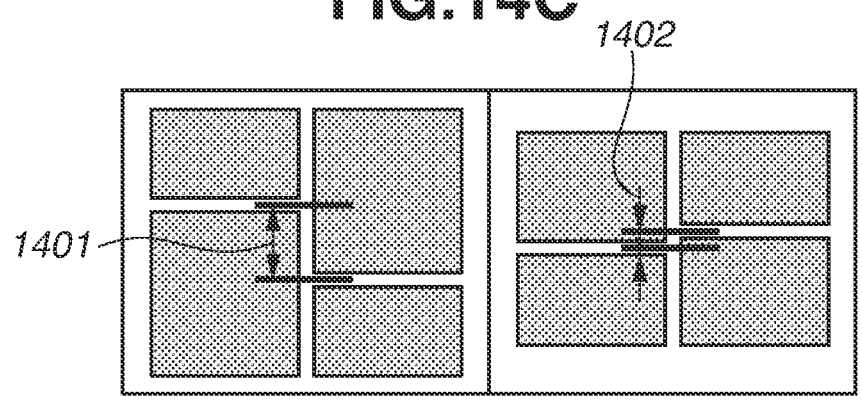

FIG.16A
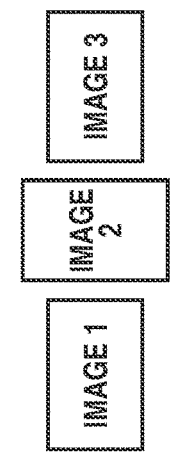
FIG.16B
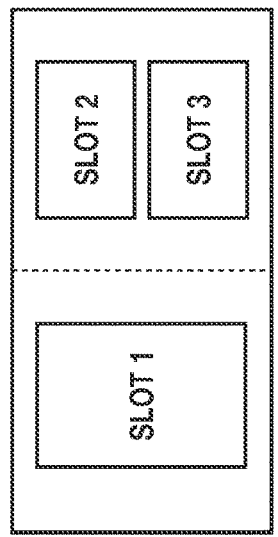
FIG.16C
| IMAGE No. | ASPECT RATIO | IMAGE SCORE | IMAGING TIME |
|---|---|---|---|
| 1 | 3:2 | 0.8 | 15:00 |
| 2 | 2:3 | 0.5 | 15:02 |
| 3 | 3:2 | 0.6 | 15:10 |
| SLOT No. | ASPECT RATIO | SLOT SCORE | POSITION No. |
|---|---|---|---|
| 1 | 2:3 | 3 | 1 |
| 2 | 3:2 | 2 | 2 |
| 3 | 3:2 | 2 | 3 |
FIG.16D
| IMAGE No. | ASPECT RATIO | IMAGE SCORE | IMAGING TIME |
|---|---|---|---|
| 1 | 3:2 | 0.8 | 15:00 |
| 3 | 3:2 | 0.6 | 15:10 |
| 2 | 2:3 | 0.5 | 15:02 |
| SLOT No. | ASPECT RATIO | SLOT SCORE | POSITION No. |
|---|---|---|---|
| 2 | 3:2 | 2 | 2 |
| 3 | 3:2 | 2 | 3 |
| 1 | 2:3 | 3 | 1 |
FIG.16E
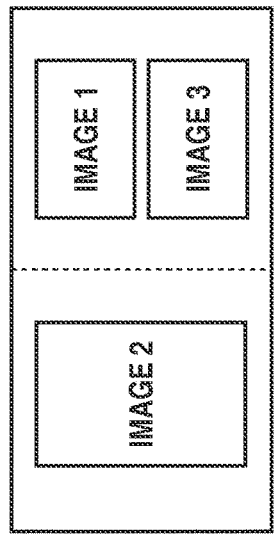

FIG.17A
TEMPLATE 1
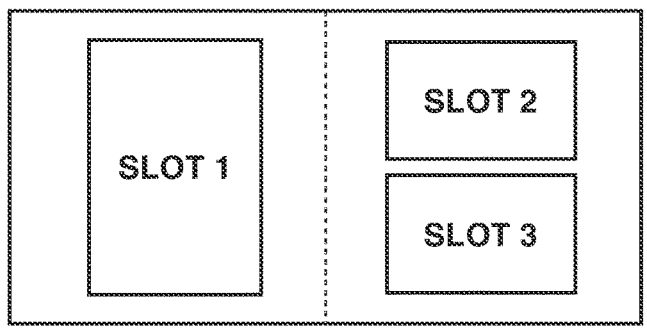
FIG.17B
TEMPLATE 2
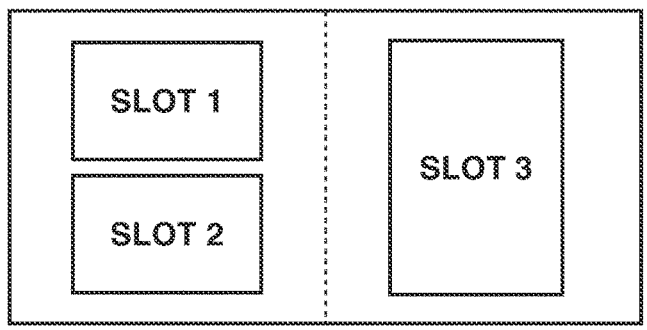
FIG.17C
| IMAGE No. | ASPECT RATIO | IMAGE SCORE | IMAGING TIME |
|---|---|---|---|
| 1 | 3:2 | 0.8 | 15:00 |
| 3 | 3:2 | 0.6 | 15:10 |
| 2 | 2:3 | 0.5 | 15:02 |
1701
| TEMPLATE 1 | | | |
|---|---|---|---|
| SLOT No. | ASPECT RATIO | SLOT SCORE | POSITION No. |
| 2 | 3:2 | 2 | 2 |
| 3 | 3:2 | 2 | 3 |
| 1 | 2:3 | 3 | 1 |
1702
| TEMPLATE 2 | | | |
|---|---|---|---|
| SLOT No. | ASPECT RATIO | SLOT SCORE | POSITION No. |
| 1 | 3:2 | 2 | 1 |
| 2 | 3:2 | 2 | 2 |
| 3 | 2:3 | 3 | 3 |
1703

CONTROL METHOD, IMAGE PROCESSING APPARATUS, AND NON-TRANSITORY COMPUTER-READABLE STORAGE MEDIUM

BACKGROUND OF THE INVENTION

Field of the Invention

The present disclosure relates to a control method, an image processing apparatus, and a non-transitory computer-readable storage medium.

Description of the Related Art

Generating a layout image by laying out image data on a template is a known technique. An example of this technique is discussed in Japanese Patent Laid-Open No. 2017-117406.

Since layout images are conventionally generated by using a predetermined template, issues may arise where a template is used that is not suitable to features of the image data to be laid out.

SUMMARY OF THE INVENTION

An aspect of the present disclosure is to eliminate the above-mentioned issue with conventional techniques.

A feature of the present disclosure is to provide a technique for generating a layout image by using a template suitable to features of image data to be laid out.

According to a first aspect of the present disclosure, there is provided a method for controlling an image processing apparatus, comprising: specifying one or a plurality of pieces of image data; generating a new template based on a feature of the specified one or plurality of pieces of image data, the generated new template including at least one or a plurality of slots for which the specified one or plurality of pieces of image data are laid out; and generating a layout image by laying out the specified one or plurality of pieces of image data to the one or plurality of slots included in the generated new template.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 14A to 14C are diagrams for describing template scoring.

FIGS. 16A to 16E are diagrams for describing an image data layout method.

FIGS. 17A to 17C are diagrams for describing layout image scoring.

DESCRIPTION OF THE EMBODIMENTS

Exemplary embodiments of the present disclosure will be described in detail below with reference to the accompanying drawings. The following exemplary embodiments are not intended to limit the present disclosure set forth in the claims, and all combinations of features described in the following exemplary embodiments are not necessarily indispensable to solution of the present disclosure.

In the following exemplary embodiments, a description will be given of a procedure from running an application program for generating an album (hereinafter, also referred to as an "album generation application") on an image processing apparatus and to generating an automatic layout will be described. Images described below include still images, moving images, and frame images in a moving image, as well as still images, moving images, and frame images in a moving image on a social networking service (SNS) server unless otherwise specified.

First Exemplary Embodiment

Figure 1:
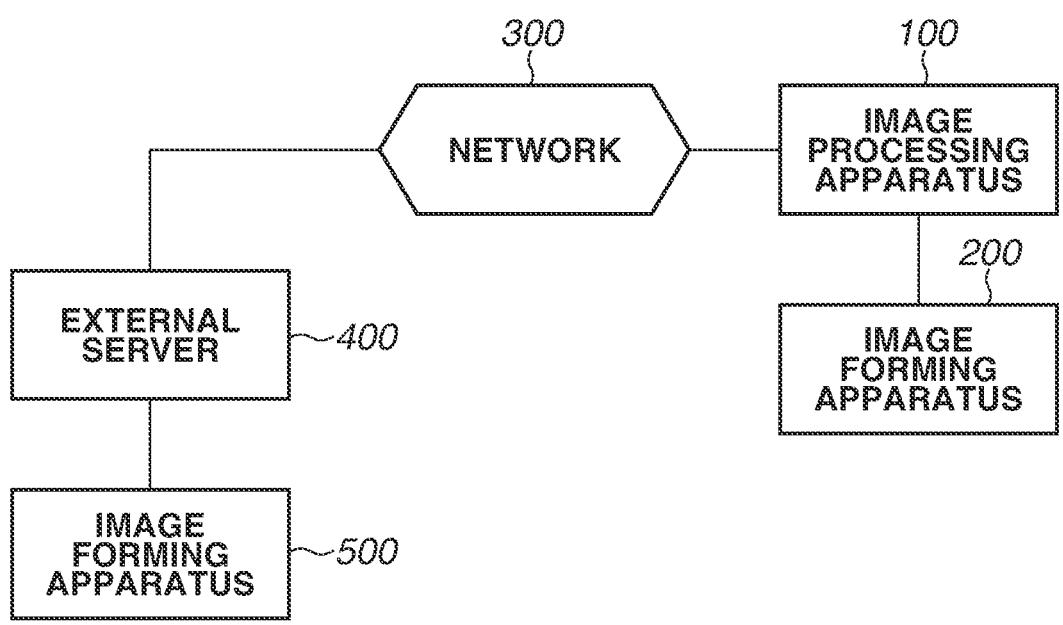
FIG. 1 is a diagram illustrating a printing system.

FIG. 1 is a diagram illustrating a printing system according to the present exemplary embodiment. The printing system includes an image processing apparatus 100, an image forming apparatus 200, a network 300, an external server 400, and an image forming apparatus 500.

The image processing apparatus 100 is an apparatus that generates album data by using an album generation application. In the present exemplary embodiment, album data refers to data for ordering and producing an album (photo album), and includes a plurality of pieces of layout information. Layout information refers to information for printing layout images to be laid out and printed on spreads (two facing pages) included in an album. In the present exemplary embodiment, the album generation application can automatically generate album data and layout information by automatic layout processing to be described below.

Examples of the image processing apparatus 100 include a personal computer (PC), a smartphone, a tablet terminal, a camera, and a printer. In the present exemplary embodiment, the image processing apparatus 100 is a PC.

The image forming apparatus 200 performs image formation processing (print processing) for forming an image on a recording medium using a recording agent based on a print job accepted from the image processing apparatus 100. In the present exemplary embodiment, a description will be given of a case where the image processing apparatus 100 transmits (output) the generated layout information to the external server 400. Alternatively, for example, the image processing apparatus 100 may be configured to transmit the generated layout information to the image forming apparatus 200 as a print job. In such a case, an album based on the layout information is generated by the image forming apparatus 200. The printing method that is used by the image forming apparatus 200 is not limited in particular. Examples include an inkjet, electrophotographic, and thermal sublimation methods.

The network 300 connects the image processing apparatus 100 with the external server 400. The network 300 is a communication network for transmitting information between the image processing apparatus 100 and the external server 400. The network 300 may be a wired or wireless network.

The external server 400 accepts layout information to be described below from the image processing apparatus 100 via the network 300. In other words, the external server 400 is a server controlling order reception and management of albums. When an album purchasing and ordering procedure is performed by a user operating the image processing apparatus 100, the external server 400 causes the image forming apparatus 500 to generate an album by image forming processing based on accepted layout information. The album generated by the image forming apparatus 500 is then delivered to the user who has performed the album purchasing and ordering procedure.

Figure 2:
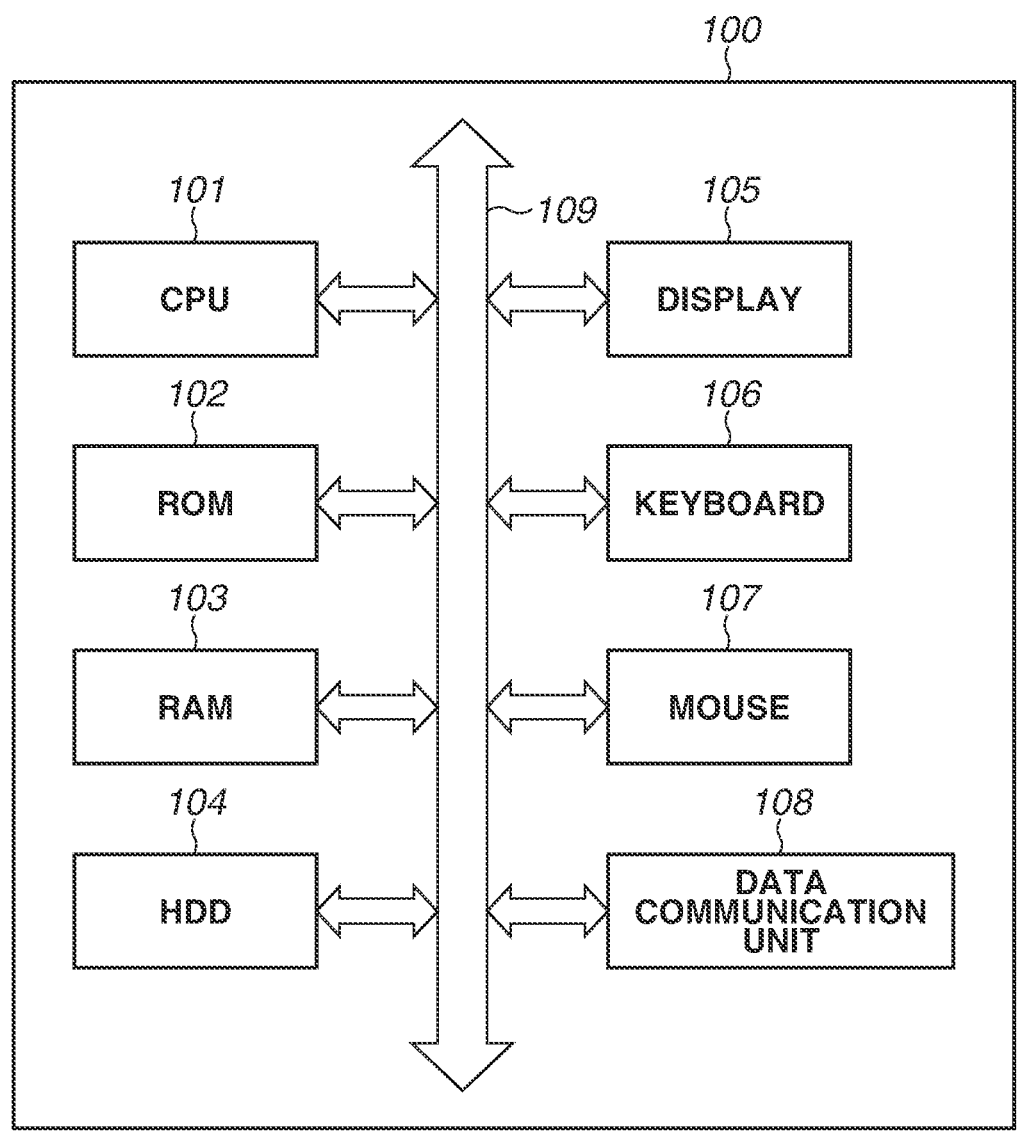
FIG. 2 is a block diagram for describing a hardware configuration of an image processing apparatus.

FIG. 2 is a block diagram for describing a hardware configuration of the image processing apparatus 100 according to the present exemplary embodiment. In FIG. 2, the image processing apparatus 100 includes a central processing unit (CPU) 101, a read-only memory (ROM) 102, a random access memory (RAM) 103, a hard disk drive (HDD) 104, a display 105, a keyboard 106, a mouse 107, and a data communication unit 108. These components of the image processing apparatus 100 are connected to each other by a data bus 109. The CPU 101, the ROM 102, and the RAM 103 constitute a computer of the image processing apparatus 100.

The CPU (processor) 101 is a system control unit and controls the entire image processing apparatus 100. The CPU 101 performs an image processing method described in the present exemplary embodiment based on a program. In FIG. 2, the number of CPUs is one. However, this is not restrictive, and the image processing apparatus 100 may include a plurality of CPUs.

The ROM 102 stores a program and an operating system (OS) to be executed by the CPU 101. The RAM 103 provides memory for temporarily storing various types of information when the CPU 101 executes the program. The HDD 104 is a storage medium for storing image files and a database retaining processing results of image analysis. In the present exemplary embodiment, the RAM 103 stores the album generation application to be described below.

The display 105 (display unit) is a device for presenting a user interface (UI) according to the present exemplary embodiment and a layout result of images to the user. The display 105 may include a touch sensor function. The keyboard 106 is one of input devices. For example, the keyboard 106 is used to input predetermined information to the UI displayed on the display 105. Examples of the predetermined information include information about the number of spreads and the number of pages of an album to be generated. The mouse 107 is one of the input devices. For example, the mouse 107 is used to click on a button on the UI displayed on the display 105. When, for example, the user double-clicks on an icon corresponding to the album generation application displayed on the display 105 by operating the mouse 107, the album generation application is activated.

The data communication unit 108 (communication unit) is a device for communicating with external apparatuses such as a printer and a server. For example, data generated by the album generation application is transmitted to a not-illustrated printer or server connected to the image processing apparatus 100 via the data communication unit 108. The data communication unit 108 also receives still image data on a not-illustrated server or SNS server. In the present exemplary embodiment, the data communication unit 108 receives still image data from the SNS server. The data communication unit 108 may receive moving image data as well.

The data bus 109 connects the foregoing units (102 to 108) with the CPU 101.

<Automatic Album Layout>

When the album generation application according to the present exemplary embodiment is installed on the image processing apparatus 100, a start icon of the album generation application is displayed on a top screen (desktop) of the OS running on the image processing apparatus 100. When the user double-clicks on the start icon on the desktop displayed on the display 105 by using the mouse 107, the album generation application (program) stored in the HDD 104 is loaded into the RAM 103. The CPU 101 executes the program loaded into the RAM 103, whereby the album generation application is activated.

In the present exemplary embodiment, the album generation application performs automatic layout processing that is processing for automatically specifying a template and generating a layout image by laying out images on the template. Generating the layout image also generates layout information for outputting (displaying/printing) the layout image. Therefore, the automatic layout processing is also processing for automatically generating layout information. The template to be automatically specified has conventionally been a template stored in the album generation application in advance and having predetermined slot shapes, sizes, and positions. There has thus been an issue that the template may not be suitable to the image data to be laid out. Specifically, for example, there has been an issue that an aspect ratio of image data to be laid out and an aspect ratio of a slot in the template differ from each other so greatly that the finished quality of the laid-out image data is deteriorated. In view of the issues, in the present exemplary embodiment, processing for generating a template suitable to the image data to be laid out is performed.

In the automatic layout processing, a plurality of pieces of layout information has conventionally been generated and evaluated, and the layout information to be actually used has been determined based on the evaluation. However, the conventional evaluation of the layout information does not take into account evaluation of a template for the layout information. In view of this, in the present exemplary embodiment, a template for the layout information is evaluated. In selecting layout information to be actually used, evaluation of a template for the layout information is referred to.

<Screen Displayed by Album Generation Application>

Figure 3:
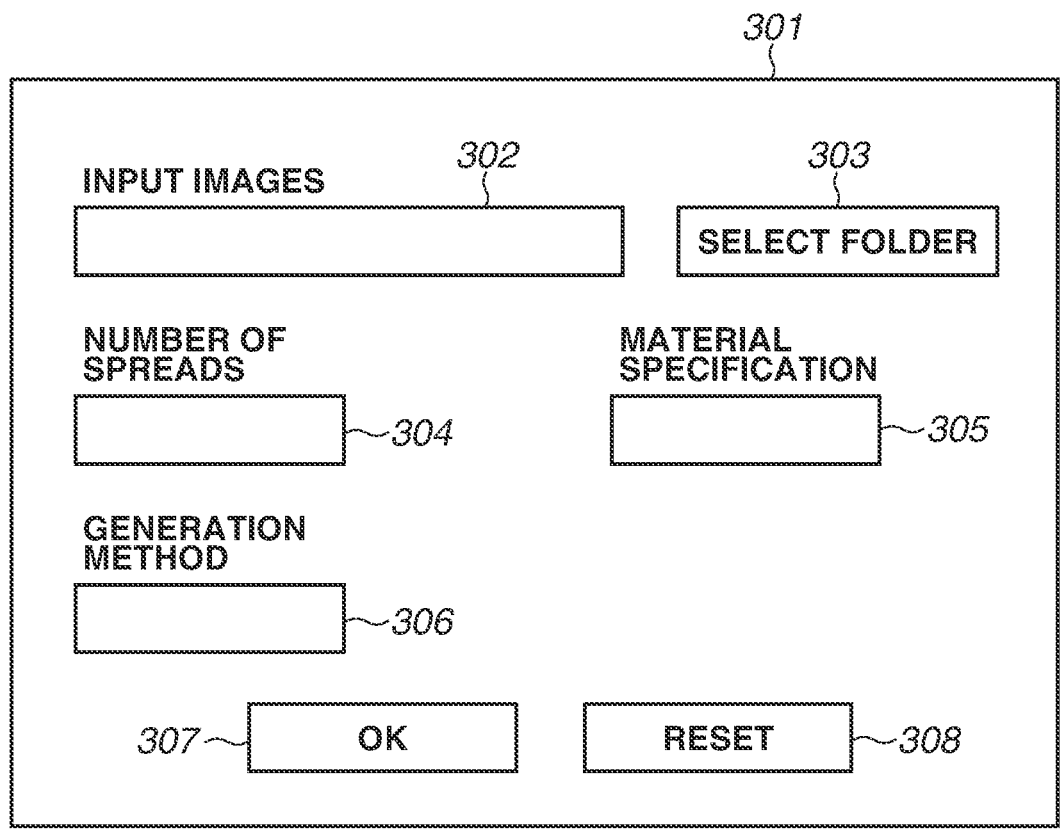
FIG. 3 is a diagram illustrating an example of an input screen provided by an album generation application.

FIG. 3 is a diagram illustrating an example of an input screen 301 provided by the activated album generation application. The input screen 301 is displayed on the display 105. The user sets album generation conditions to be described below via the input screen 301, and the album generation application obtains the settings specified by the user.

A path box 302 on the input screen 301 displays a storage location (path) of an image data group, to be used in album generation, in the HDD 104. When the user clicks on a folder selection button 303 by operating the mouse 107, folders containing image data groups to be used in album generation are displayed in a tree configuration in a user-selectable manner. The path to the folder containing an image data group selected by the user is displayed in the path box 302. While, in the above description, the image data to be used in album generation is specified by specifying the folder containing the image data, such a configuration is not restrictive. Alternatively, the user may select, from among image data in a folder, pieces of image data to be used in album generation.

A spread number box 304 accepts a setting about the number of spreads in the album from the user. The user either directly inputs numerals into the spread number box 304 via the keyboard 106 or inputs numerals into the spread number box 304 from a list by using the mouse 107. A spread refers to an area covering two facing pages in an album. Here, the number of spreads where layout images, i.e., images formed by laying out images on templates are printed (i.e., the number of spreads included in the main body) among the spreads included in the album is input to the spread number box 304.

A material specification box 305 accepts settings about materials to be used in an album that is generated from album data. Specific examples of the material settings include settings about a size of the album, a sheet type of a front cover of the album, and a sheet type of pages of the album other than the front cover. Alternatively, a binding method of an album to be generated from the album data may be set.

A generation method specification box 306 accepts a setting about a generation method of the album data. In the present exemplary embodiment, generation methods of album data include automatic generation and manual generation. Details of the methods will be described below.

An OK button 307 is a button for starting generation of the album data based on information input from the input screen 301.

A reset button 308 is a button for resetting the pieces of setting information on the input screen 301.

On the input screen 301, settings other than the foregoing may also be set. For example, settings about a moving image and settings about the acquisition sources of image data and moving image data may be set. As another example, a central character of an album may be set. When a central character is set, the album is controlled to mainly include images including the person set as the central character. Yet another example, an album mode may be set. Album modes are intended to lay out images including a predetermined object on a template by priority. In each mode, an album mainly includes objects corresponding to the mode. Examples of the modes to be set here include "people", "animals", and "food". The input screen 301 illustrated in FIG. 3 may also include, for example, an area where conceptual rendering of the completed album expressed by the layout information generated based on input settings is displayed.

In the present exemplary embodiment, in a case where automatic generation is selected as the generation method of album data, the album generation application automatically generates the album data based on conditions input from the input screen 301, and then displays an edit screen for editing the automatically generated album data. Meanwhile, in a case where manual generation is selected as the generation method of album data, the album generation application displays an edit screen for editing album data where no image data is laid out. User's selections are accepted on the edit screen, and image data is laid out to generate album data.

Figure 5:
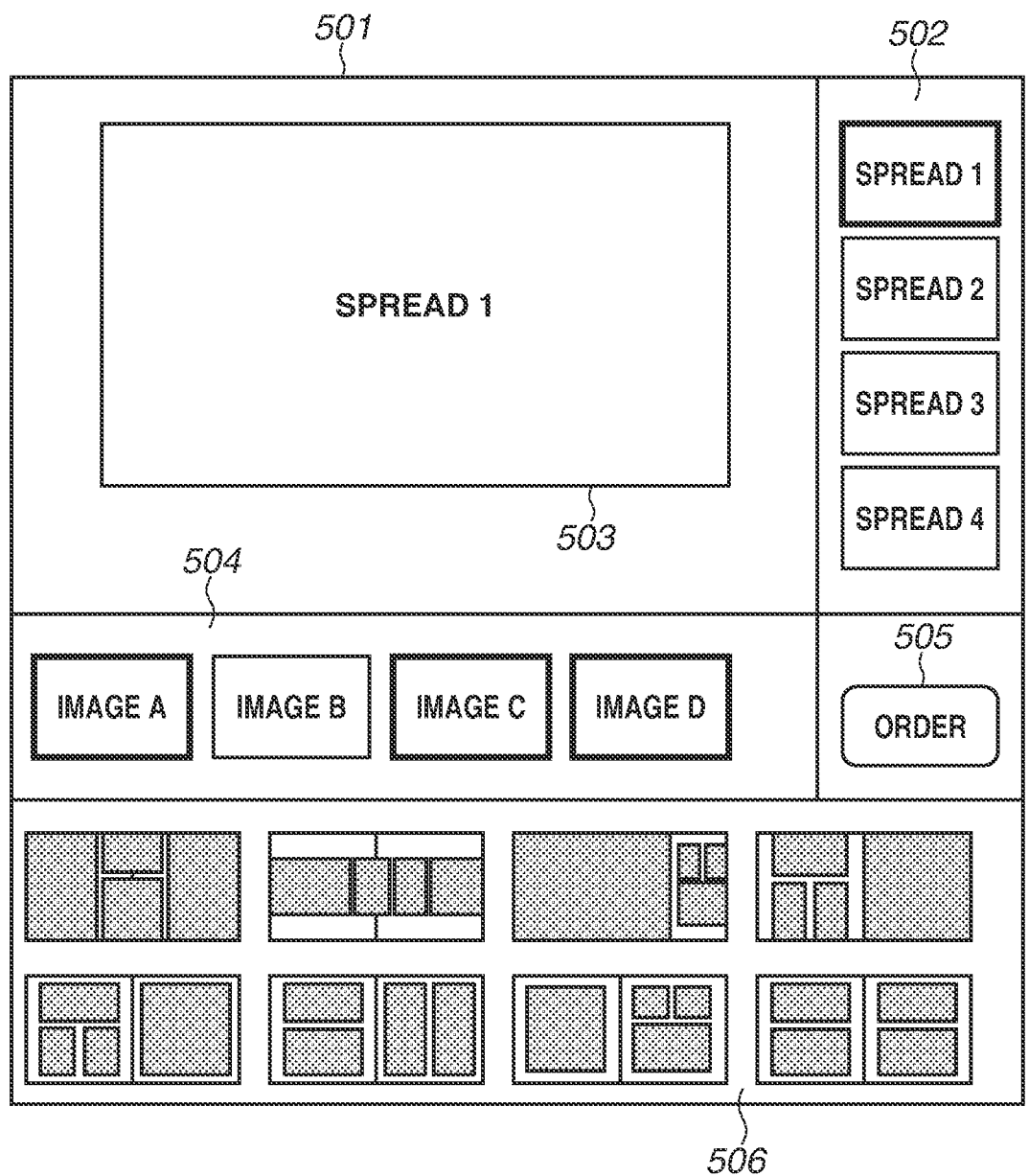
FIG. 5 is a diagram illustrating an example of an edit screen provided by the album generation application.

FIG. 5 is a diagram illustrating an example of an edit screen 501 provided by the album generation application. The edit screen 501 includes a spread list 502, a spread display section 503, an image list 504, an order button 505, and a candidate display area 506.

The spread list 502 lists candidate spreads to be selected. The user can select one of the spreads included in the spread list 502 by clicking on the spread with the mouse 107.

The spread display section 503 displays the spread selected from the spread list 502. When the automatic layout processing is completed and a layout image corresponding to the selected spread has been generated, the spread display section 503 displays the layout image.

The spread list 502 and the spread display section 503 are not limited to a spread display. For example, the spread list 502 and the spread display section 503 may be configured to display areas page by page. Alternatively, the spread list 502 and the spread display section 503 may be switched between the state of displaying spreads and the state of displaying pages. In such a case, for example, the spread list 502 and the spread display section 503 display the front and the back in a single-page display and the main body in a spread display.

The image list 504 lists thumbnail images of image data corresponding to the path specified in the path box 302 (image data selected by the user). The image data corresponding to a thumbnail image selected from the image list 504 is laid out on the spread displayed on the spread display section 503. In other words, the user can specify the image data to be laid out on the spread displayed on the spread display section 503 by clicking on one of the thumbnail images included in the image list 504 with the mouse 107. In this process, the user can select a plurality of thumbnail images. Thumbnail images of image data other than those of the image data selected by the user in the path box 302 may be added to the image list 504. For example, new image data is added to the image list 504 by dragging and dropping the image data from a folder into the image list 504. In a case where image data is added to the image list 504, the added image data is analyzed as will be described below in step S403.

The order button 505 is a button for ordering an album based on the generated album data. After the order button 505 is pressed and a predetermined ordering procedure is performed by the user, the album data is transmitted to the external server 400.

The candidate display area 506 is an area for displaying candidate templates to be used in generating a layout image laid out on the spread displayed on the spread display section 503. Details of operations on the candidate display area 506 will be described below.

In FIG. 5, no layout image is displayed in the spread list 502 or the spread display section 503. In a case where layout images are laid out on the spreads by the automatic layout processing, the layout images are displayed in the spread list 502 and the spread display section 503.

<Automatic Layout Processing>

The automatic layout processing performed in the case where automatic generation is selected as the generation method of album data will initially be described below.

Figure 4:
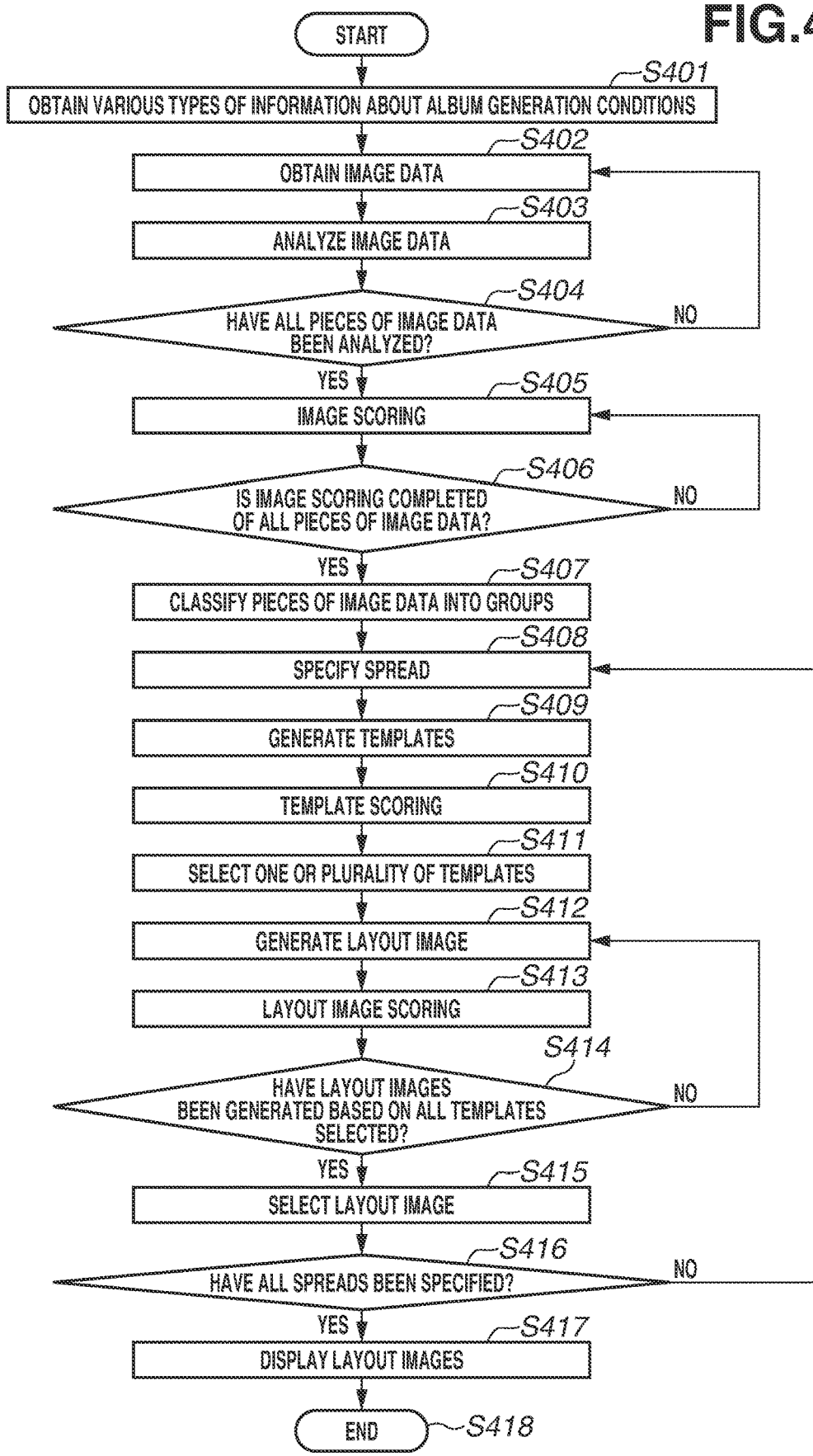
FIG. 4 is a flowchart illustrating automatic layout processing that is performed by the album generation application.

FIG. 4 is a flowchart illustrating the automatic layout processing performed by the album generation application according to the present exemplary embodiment. The flowchart illustrated in FIG. 4 is implemented, for example, by the CPU 101 reading the program corresponding to the album generation application stored in the HDD 104 into the RAM 103 and executing the program. The flowchart illustrated in FIG. 4 is started when the OK button 307 is operated in a state where automatic generation is selected as the generation method of album data.

In step S401, the CPU 101 obtains various types of information about the album generation conditions input to the input screen 301.

In step S402, the CPU 101 refers to the information obtained in step S401, and obtains a piece of image data stored in the folder corresponding to the path specified in the path box 302.

In step S403, the CPU 101 analyzes the image data obtained in step S402. Specifically, the CPU 101 performs feature amount extraction processing, object detection processing, and face detection processing. The CPU 101 also obtains an image size and an imaging date and time from metadata (exchangeable image file format (Exif) information) accompanying the image data.

The feature amount extraction processing will be described. Examples of a feature amount include focus on the image expressed by the image data. Edges for obtaining the feature amount "focus" (focus amount) are detected, for example, by using a general Sobel filter. The Sobel filter is used to detect edges, and an intensity difference between the start and end points of each edge can be divided by the distance between the start and end points to calculate an edge inclination, i.e., intensity gradient. An average edge inclination in the image is then calculated. An image having a greater average inclination can be regarded as being in more precise focus than an image having a smaller average inclination. Given a plurality of inclination thresholds having different values, an evaluation value for the focus amount can be output by determining which threshold the inclination is greater than or equal to. In the present exemplary embodiment, two different thresholds are set in advance to determine the focus amount in three grades A, B, and C. The thresholds are set in advance by experiment so that focus amounts desirable for an album are evaluated as "A", acceptable focus amounts as "B", and not-acceptable focus amounts as "C". The threshold settings may be set by the creator of the album generation application, for example. The thresholds may be set from the UI. In the present exemplary embodiment, information about the imaging date and time of the image data and the size and aspect ratio of the image expressed by the image data is also extracted as feature amounts.

The face detection processing and the object detection processing will be described. By the face detection processing, the CPU 101 detects a human face from the image expressed by the image data obtained in step S402. Conventional methods may be used for the face detection processing. For example, Adaptive Boosting (AdaBoost) for generating a strong discriminator from a plurality of weak discriminators which have been provided is used. In the present exemplary embodiment, a face image of a person (object) is detected by using a strong discriminator generated by AdaBoost. Along with the extraction of the face image, the CPU 101 obtains the top left and bottom right coordinate values of the position of the detected face image. The two types of coordinate values enable the CPU 101 to obtain the position and size of the face image. In the object detection processing, the CPU 101 also detects predetermined objects other than face images by using a strong discriminator generated by AdaBoost. In the present exemplary embodiment, the objects to be detected by the object detection processing are animals such as cats and dogs. The objects are not limited to animals such as cats and dogs, and objects such as flowers, food, buildings, figures, and vehicles may be detected. Instead of AdaBoost, a deep neural network may be used to search for objects.

Image analysis information about each piece of image data obtained here is distinguished by an identifier (ID) for image identification and stored in the HDD 104.

In step S404, the CPU 101 determines whether all the pieces of image data obtained in step S402 have been analyzed. In a case where the determination is yes (YES in step S404), the processing proceeds to step S405. In a case where the determination is no (NO in step S404), the processing returns to step S402. In step S402, the CPU 101 obtains a piece of image data not analyzed yet.

In step S405, the CPU 101 performs image scoring. The image scoring in step S405 refers to processing (scoring processing) for giving evaluation scores to the respective pieces of image data based on the analysis result of step S403. In the present exemplary embodiment, the CPU 101 performs the image scoring in a plurality of aspects based on the analysis result of step S403. In other words, the image scoring according to the present exemplary embodiment gives each piece of image data a plurality of scores. Specifically, in the present exemplary embodiment, each piece of image data is given scores in two aspects, namely, one based on a feature amount (image quality in particular) and one based on the result of the face detection.

Initially, image scoring based on image quality will be described. In the present exemplary embodiment, for example, the image scoring based on the image quality uses feature amounts such as focus and the number of pixels. Specifically, for example, scores based on image quality are given so that image data obtained "A" in the feature amount of focus in step S403 is given a score higher than that of image data obtained "B" or "C" in the feature amount of focus. As another example, scores based on image quality are given to the image data so that image data expressing an image having a higher number of pixels is given a score higher than that of image data expressing an image having a lower number of pixels. The feature amounts used in the image scoring based on image quality may be imaging information such as information about the lenses used during imaging, or the compression formats of the images input to the album generation application. The sizes, resolution, and contrast of the images displayed based on the image data may also be used.

Next, image scoring based on face detection results will be described. This image scoring is performed based on information about whether a human face is detected in step S403 and information about the size of the face detected in step S403. For example, scores are given to the image data so that image data including a human face is given a score higher than image data not including a human face. As another example, scores are given to the image data so that image data where a human face occupies a large area (size) is given a score higher than image data where a human face occupies a small area. As another example, scores are given to the image data so that image data including a smiling face is given a score higher than image data including a not-smiling face.

Next, image scoring based on object detection results will be described. This image scoring is performed based on information about whether an animal is detected in step S403 and information about the size of the animal detected in step S403. For example, scores are given to the image data so that image data including an animal is given a score higher than image data not including an animal. As another example, scores are given to the image data so that image data where an animal occupies a large area (size) is given a score higher than image data where an animal occupies a small area.

In step S406, the CPU 101 determines whether the image scoring of step S405 is completed of all the pieces of image data obtained in step S402. In a case where the determination is yes (YES in step S406), the processing proceeds to step S407. In a case where the determination is no (NO in step S406), the processing returns to step S405. In step S405, the CPU 101 performs the image scoring on a piece of image data on which the image scoring is not performed yet.

In step S407, the CPU 101 classifies the pieces of image data obtained in step S402 into groups. The pieces of image data are grouped so that the number of groups generated in this process coincides with the number of spreads input in the spread number box 304. Specifically, the CPU 101 initially sorts the pieces of image data obtained in step S402 in ascending order of the imaging date and time based on the feature amounts (imaging dates and times) obtained by the analysis in step S403. The CPU 101 then obtains time differences between the imaging times of the respective pieces of image data. The CPU 101 then classifies the sorted pieces of image data into groups by dividing the pieces of image data in order where the time difference is greater. The CPU 101 then assigns the resulting groups of pieces of image data to the spreads to be generated in time-series order. More specifically, the CPU 101 assigns a group including pieces of image data having earlier imaging dates and times to a spread having lower page numbers. In such a manner, which piece of image data is laid out on which spread is specified.

In step S408, the CPU 101 specifies a spread to be automatically laid out among spreads not automatically laid out yet. In the present exemplary embodiment, a spread having the lowest two page numbers among the spreads not automatically laid out yet is specified. Here, the CPU 101 obtains the pieces of image data to be laid out on the specified spread and the analysis result of the pieces of image data.

In step S409, the CPU 101 generates a template to be used for the automatic layout of the spread specified in step S408. Details of this processing are described below.

Figure 6:
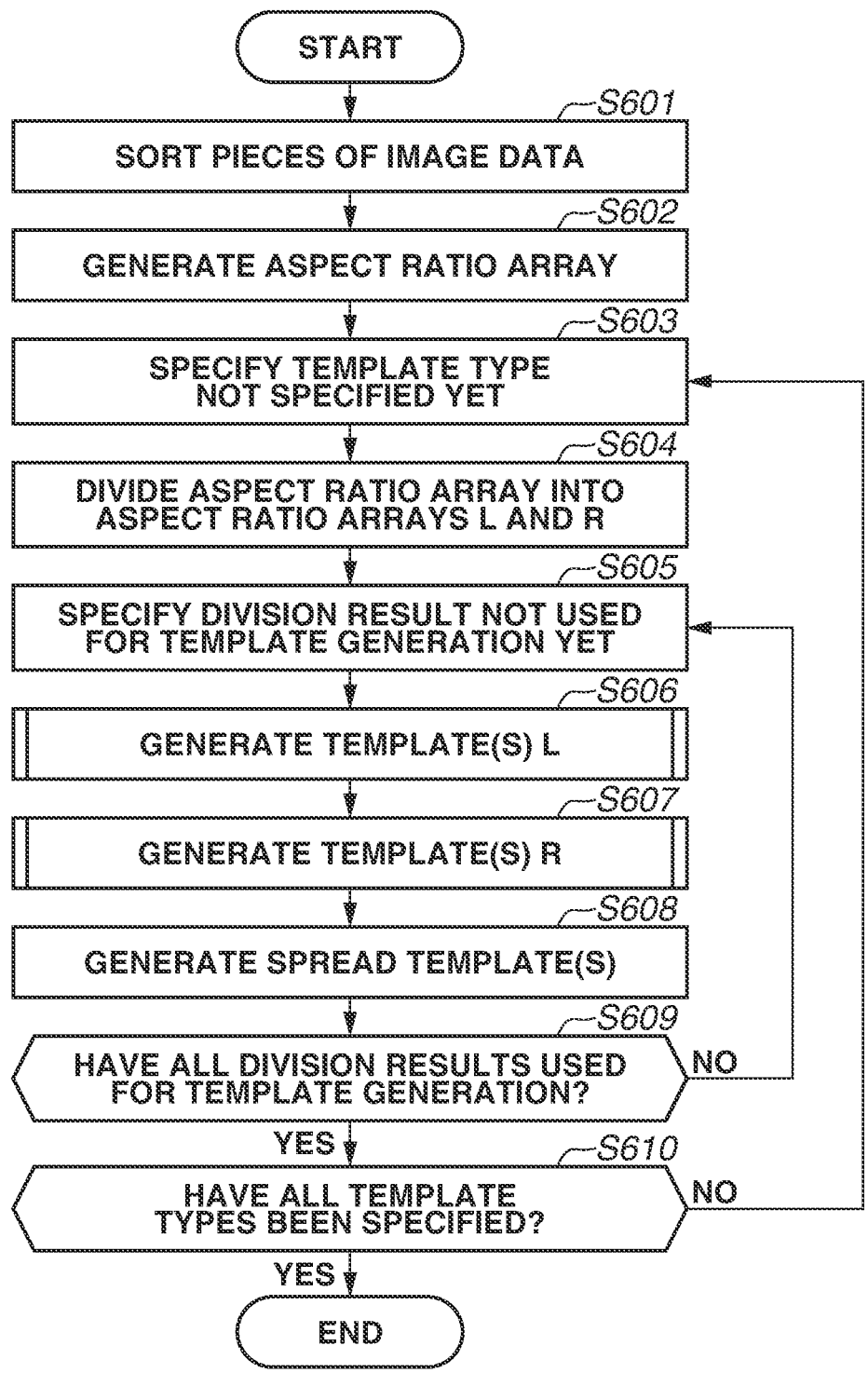
FIG. 6 is a flowchart illustrating template generation processing that is performed by the album generation application.

FIG. 6 is a flowchart illustrating template generation processing performed by the album generation application according to the present exemplary embodiment. The flowchart illustrated in FIG. 6 is implemented, for example, by the CPU 101 reading the program corresponding to the album generation application stored in the HDD 104 into the RAM 103 and executing the program. The flowchart illustrated in FIG. 6 illustrates the processing corresponding to step S409.

In step S601, the CPU 101 sorts the pieces of image data obtained in step S408 in ascending order of the imaging date and time based on the feature amounts (imaging dates and times) obtained by the analysis in step S403.

In step S602, the CPU 101 specifies the aspect ratios of the pieces of image data sorted in step S601 and generates an aspect ratio array. The aspect ratio array includes values obtained by arranging the specified aspect ratios in the same order as that of the pieces of image data in step S601. In the present exemplary embodiment, an aspect ratio refers to "the height of an image expressed by image data/the width of the image expressed by the image data". In a case where the pieces of image data have various aspect ratios, a suitable template may fail to be generated by the template generation processing to be described below. The CPU 101 thus performs processing for reducing variations in the aspect ratios of the pieces of image data. Specifically, the CPU 101 calculates the number N_1 of pieces of image data where the value of "the length of the short side of the image expressed by the image data/the length of the long side of the image expressed by the image data" is (2/3+3/4)/2 or more and less than 1. The CPU 101 also calculates the number N_s of pieces of image data where the value of "the length of the short side of the image expressed by the image data/the length of the long side of the image expressed by the image data" is less than (2/3+3/4)/2. In a case where N_s<N_1, the CPU 101 replaces the aspect ratio(s) of the piece(s) of image data having an aspect ratio of less than 1 with 3/4, and replaces the aspect ratio(s) of the piece(s) of image data having an aspect ratio of greater than 1 with 4/3. On the other hand, in a case where N_s>N_1, the CPU 101 replaces the aspect ratio(s) of the piece(s) of image data having an aspect ratio of less than 1 with 2/3, and replaces the aspect ratio(s) of the piece(s) of image data having an aspect ratio of greater than 1 with 3/2. The CPU 101 maintains the aspect ratio(s) of the piece(s) of image data having an aspect ratio of 1 unchanged. As a result, in a case where, for example, five pieces of data are assigned to the spread specified in step S408, an aspect ratio array such as {1, 1, 1, 4/3, 3/4} is generated.

In step S603, the CPU 101 specifies a template type not specified yet. In the present exemplary embodiment, types of templates (template types) illustrated in FIGS. 10A to 10F are generated by the template generation processing. In FIGS. 10A to 10F, the center line in each template represents a line corresponding to the center line of the spread, i.e., a line corresponding to the binding part of the album. While FIGS. 10A to 10F illustrate configurations where slots are already laid out, which slots to be laid out on the layout areas indicated by the broken lines is determined by subsequent processing. Examples of the templates generated by the template generation processing include a type of template where a slot laid out across both the right and left pages can be laid out, and a type of template where a slot laid out across both the right and left pages is not laid out. The examples include also a type of template where slots are not laid out on the left page but only on the right page. The examples further include a type of template having a large amount of blanks, and a type of template having a small amount of blanks. The examples yet further include a type of template including not only a slot of which shape is determined based on the features of the image data to be used but also a fixed slot having a predetermined size, position, and shape. In the present exemplary embodiment, the CPU 101 specifies a template type not specified yet among the template types illustrated in FIGS. 10A to 10F. The template types illustrated in FIGS. 10A to 10F are merely examples, and other template types may be specified. Template types to be specified may be changed based on the album generation conditions. For example, in a case where the album is bound by saddle stitching or interleaving, visibility of an image is not deteriorated even if the image laid out across both the left and right pages of a spread. Therefore, in a case where the album is bound by saddle stitching or interleaving, types of templates including a slot laid out across both the left and right pages of the spread can be used. Meanwhile, in a case where the album is bound by adhesive binding or side sewing, visibility of an image laid out across both the left and right pages of a spread is deteriorated. Therefore, using the types of templates including a slot laid out across both the left and right pages of the spread is not desirable. Thus, in a case where the album is bound by adhesive binding or side sewing, the CPU 101 controls template types so that templates where a slot laid out across both the left and right pages of the spread can be included (for example, see FIGS. 10B, 10D, and 10E) are not specified in step S603. In a case where the album is bound by saddle stitching or interleaving, all the template types can be specified. The template types to be specified may also be changed based on the page numbers of the spread. For example, suppose that a background image is laid out on a specific page of the album. Suppose also that a specific type of template (such as one illustrated in FIG. 10A) is controlled to be used as a template type for the page where the background image is laid out. In such a case, only the specific type of template may be controlled to be specified.

Figure 10A:
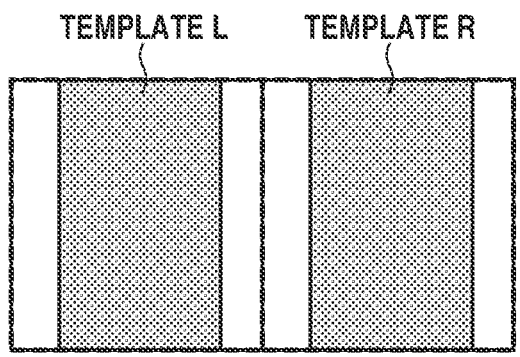
FIGS. 10A to 10F are diagrams each illustrating an example of a spread template generated.

In step S604, the CPU 101 divides the aspect ratio array generated in step S602 based on the template type specified in step S603 to generate an aspect ratio array L and an aspect ratio array R. In the present exemplary embodiment, the template generation processing automatically generates two templates (template L and template R), and therefore a template made of combination of the two templates L and R and a template made of either one of the templates L and R can be generated. An example of the former template is the type of template illustrated in FIG. 10A. Examples of the latter templates include the types of templates illustrated in FIGS. 10B to 10F. In generating a layout image by using the type of template illustrated in FIG. 10A, the pieces of image data assigned to the spread specified in step S408 are divided into two groups. Either one of the groups is laid out on the template L, and the other on the template R. In a case where the template type illustrated in FIG. 10A is specified in step S603, the CPU 101 thus obtains a division result by dividing the aspect ratio array in half. Specifically, for example, in a case where the aspect ratio array generated in step S602 is $\{1, 1, 4/3, 3/4\}$. In such a case, the CPU 101 obtains an aspect ratio array L $\{1, 1\}$ and an aspect ratio array R $\{4/3, 3/4\}$ as the division result. The CPU 101 may obtain a plurality of division results here. Specifically, for example, aside from the division result obtained by dividing the aspect ratio array in half, the CPU 101 may obtain a division result by dividing the aspect ratio array in half and then moving one to three aspect ratios from one of the divided aspect ratio arrays to the other. In generating a layout image by using any one of the types of templates illustrated in FIGS. 10B to 10F, all the pieces of image data assigned to the spread specified in step S408 are laid out on the one template. For that purpose, in a case where any one of the template types illustrated in FIGS. 10B to 10F is specified in step S603, the CPU 101 obtains a division result by assigning all the aspect ratios to the aspect ratio array L and none to the aspect ratio array R. Specifically, for example, in a case where the aspect ratio array generated in step S602 is $\{1, 1, 4/3, 3/4\}$, the CPU 101 obtains an aspect ratio array L $\{1, 1, 4/3, 3/4\}$ and an aspect ratio array R $\{\ \}$ as the division result. While an aspect ratio array L is mainly intended for the left page of the spread specified in step S408, a template generated based on the aspect ratio array L can be laid out on the right page or on the spread including both the left and right pages. The aspect ratio array R is an aspect ratio array intended for the right page of the spread specified in step S408.

In step S605, the CPU 101 specifies, from among the division results obtained in step S604, a division result not used for template generation yet.

In step S606, the CPU 101 generates a template L based on the division result specified in step S605. A template L corresponds mainly to a template intended for the left page of the spread specified in step S408 However, this is not restrictive, and a template L can correspond to a template intended for the right page or one for the spread.

In step S607, the CPU 101 generates a template R based on the division result specified in step S605. A template R corresponds to a template for the right page of the spread specified in step S408. Details of the processing of steps S604 and S605 will now be described.

Figure 7:
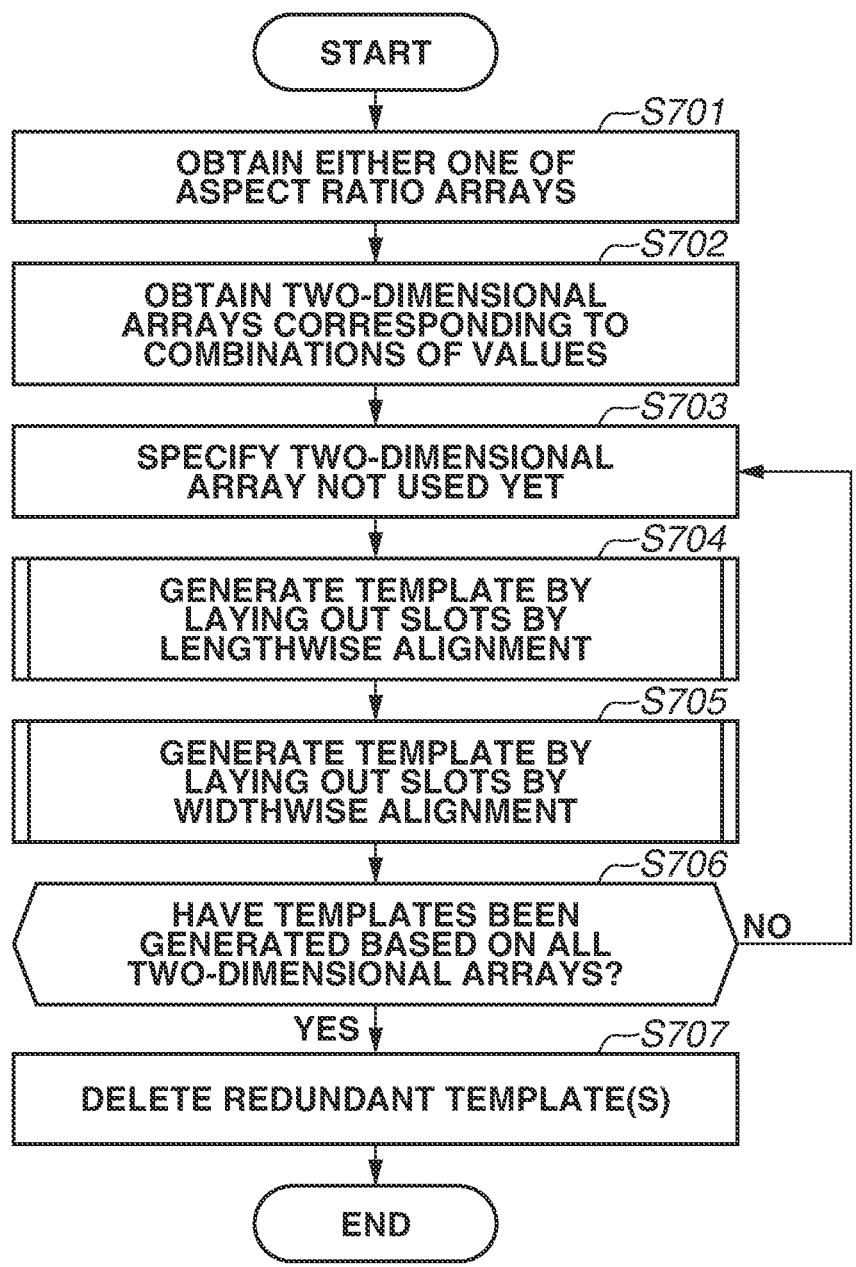
FIG. 7 is a flowchart illustrating processing that is performed by the album generation application to generate a template or templates L or R.

FIG. 7 is a flowchart illustrating the processing for generating a template L or R, performed by the album generation application according to the present exemplary embodiment. The flowchart illustrated in FIG. 7 is implemented, for example, by the CPU 101 reading the program corresponding to the album generation application stored in the HDD 104 into the RAM 103 and executing the program. The flowchart illustrated in FIG. 7 illustrates the processing corresponding to steps S606 and S607.

In step S701, the CPU 101 obtains either one of the aspect ratio arrays L and R included in the division result specified in step S605. In a case where the present processing is the processing of step S606, the CPU 101 obtains the aspect ratio array L. In a case where the present processing is the program of step S607, the CPU 101 obtains the aspect ratio array R.

In step S702, the CPU 101 calculates all combinations of the values included in the aspect ratio array obtained in step S701 and obtains two-dimensional arrays corresponding to the respective combinations. In a case where the number of pieces of image data to be laid out on the template L is N, $2^{\wedge}(N-1)$ two-dimensional arrays are obtained. More specifically, for example, in a case where the aspect ratio array L is $\{1, 1, 1\}$, four patterns of two-dimensional arrays $\{\{1, 1, 1\}\}$, $\{\{1\}, \{1, 1\}\}$, and $\{\{1\}, \{1\}, \{1\}\}$ are obtained. The one-dimensional arrays included in each two-dimensional array correspond to the aspect ratio(s) of the piece(s) of image data to be laid out in the respective columns of the template. In the present exemplary embodiment, the processing of steps S703 to S706 is repeated as many times as the number of two-dimensional arrays obtained here. In a case where the number N of pieces of image data is large and an enormous number of two-dimensional arrays are obtained, the processing of steps S703 to S706 takes a lot of time to repeat. In such a case, for example, some of the two-dimensional arrays obtained here may be deleted to reduce the time to repeat the processing of steps S703 to S706. Specifically, for example, two-dimensional arrays where the number of aspect ratios included in at least one one-dimensional array is N/10 or less may be deleted.

In step S703, the CPU 101 specifies, from among the plurality of two-dimensional arrays obtained in step S702, a two-dimensional array not used for template generation yet.

In step S704, the CPU 101 generates a template L by laying out slots in lengthwise alignment based on the two-dimensional array specified in step S703. Details of this processing are described below.

Figure 8A:
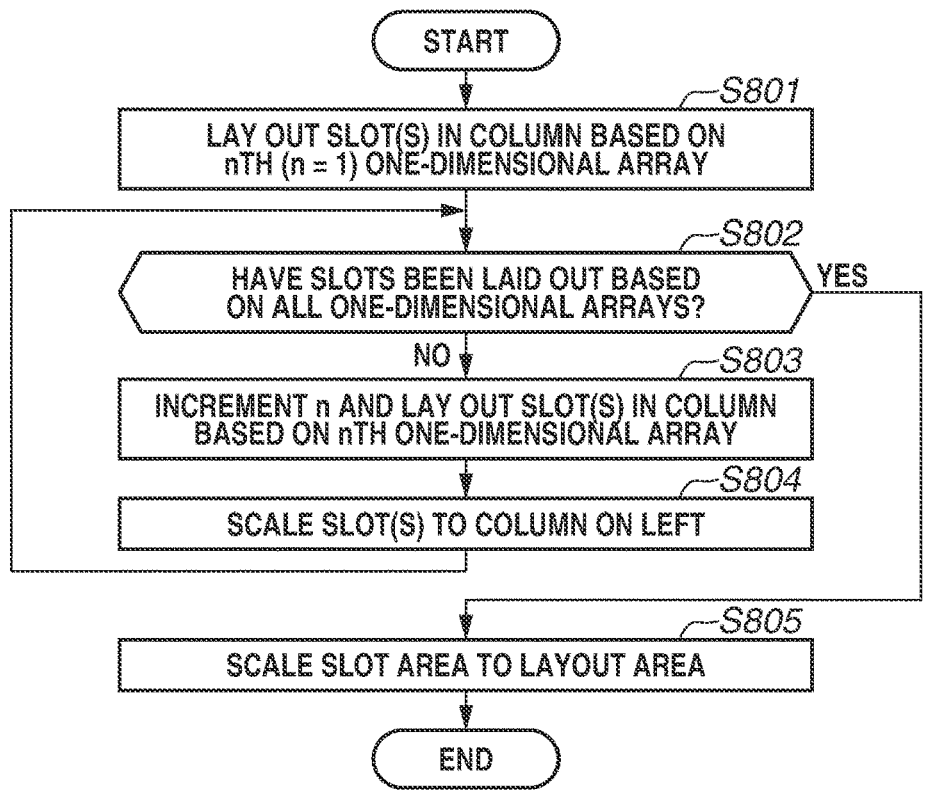
FIGS. 8A and 8B are flowcharts illustrating template generation processing using lengthwise alignment and widthwise alignment that is performed by the album generation application.

FIG. 8A is a flowchart illustrating template generation processing by lengthwise alignment, performed by the album generation application according to the present exemplary embodiment. The flowchart illustrated in FIG. 8A is implemented, for example, by the CPU 101 reading the program corresponding to the album generation application stored in the HDD 104 into the RAM 103 and executing the program. The flowchart illustrated in FIG. 8A illustrates the processing corresponding to step S704.

Figure 9A:
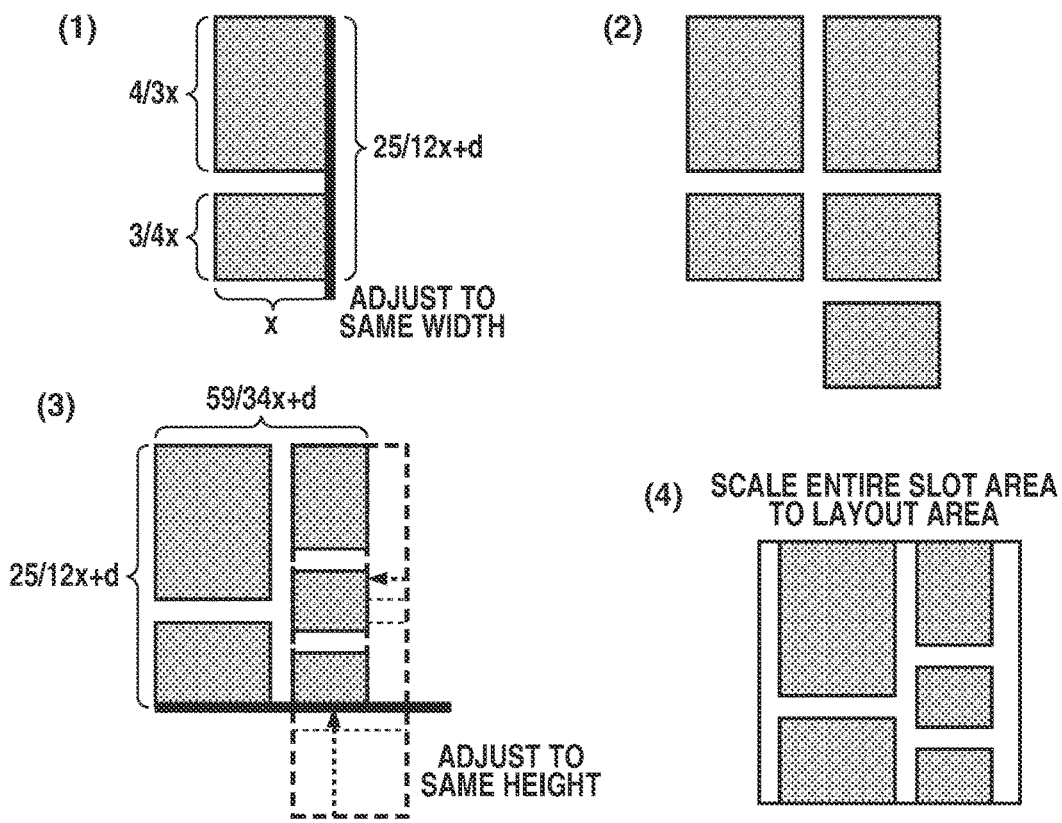
FIGS. 9A and 9B are diagrams for describing a slot layout method.

In step S801, the CPU 101 generates a slot area by laying out a slot or slots having the aspect ratio(s) included in an nth one-dimensional array in the two-dimensional array specified in step S703 in order from above. Since n has an initial value of 1, the CPU 101 here lays out the slot(s) having the aspect ratio(s) included in the first one-dimensional array on the slot area. In a case where a plurality of slots is laid out, a predetermined width d of blank is interposed between the slots. Moreover, in a case where a plurality of slots is laid out, the CPU 101 scales (expands or reduces) the slots without changing the aspect ratios so that the added (laid-out) slots have the same width. Specifically, the CPU 101 scales the slots so that the added slots have a predetermined width. For example, in a case where that the two-dimensional array specified in step S703 is {{4/3, 3/4}, {4/3, 3/4, 3/4}}. In such a case, the first one-dimensional array is {4/3, 3/4}, and slots are laid out in the slot area as illustrated in FIG. 9A(1).

In step S802, the CPU 101 determines whether slots have been laid out based on all the one-dimensional arrays included in the two-dimensional array specified in step S703. In a case where the determination is yes (YES in step S802), the processing proceeds to step S805. In a case where the determination is no (NO in step S802), the processing proceeds to step S803.

In step S803, the CPU 101 increments the value of n, and lays out a slot or slots having the aspect ratio(s) included in the nth one-dimensional array in the two-dimensional array specified in step S703 in the column on the right of the slot(s) previously laid out, in order from above. In a case where the two-dimensional array specified in step S703 is {{4/3, 3/4}, {4/3, 3/4, 3/4}}, the second one-dimensional array is {4/3, 3/4, 3/4}}. The slots are thus laid out in the slot area as illustrated in FIG. 9A(2).

In step S804, the CPU 101 scales the slots) included in the column added in step S803 without changing the aspect ratio(s) so that the column added in step S803 has the same height as that of the column on the left of the column added in step S803. In a case where the two-dimensional array specified in step S703 is {{4/3, 3/4}, {4/3, 3/4, 3/4}}, the slots are laid out in the slot area as illustrated in FIG. 9A(3). The processing returns to step S802.

In step S805, the CPU 101 scales the slot area generated by the processing of steps S801 to S804 to the layout area of the type of template specified in step S603. The slot area is thereby scaled as illustrated in FIG. 9A(4). The CPU 101 lays out the scaled slot area in the layout area. In a case where the present processing is the processing included in the generation processing of the template L, the slot area is scaled to the layout area of the template L and laid out in the layout area of the template L. Meanwhile, in a case where the present processing is the processing included in the generation processing of the template R, the slot area is scaled to the layout area of the template R and laid out in the layout area of the template R. In such a manner, the template L or R is generated by lengthwise alignment.

After the generation of the template L or R by laying out the slot area in the layout area, the CPU 101 may adjust the sizes of the slots included in the template L or R. The reasons are described below.

For example, the actual process of album generation can include a step of printing a layout image on a sheet of paper greater than the spread size and cutting the sheet into the spread size. Here, some errors can occur in the cutting position of the sheet. For example, in a case where a layout image including a slot laid out along an end of the template is printed on a spread and the cutting position shifts outward in cutting such a spread, an unintended blank can occur between the image in the slot and the end of the spread.

As another example, in a case where a slot is arranged near an end of the template and there is a narrow blank between an end of the slot and the end of the template, a narrow blank occurs consequently in the end part of the printed spread. However, a layout image having a narrow blank is undesirable in terms of finished quality.

For such reasons, an unsatisfactory album may be obtained depending on the slot positions. In the present exemplary embodiment, the CPU 101 thus scales up a slot when an end of the slot is located along or near an end of the template.

Figure 11:
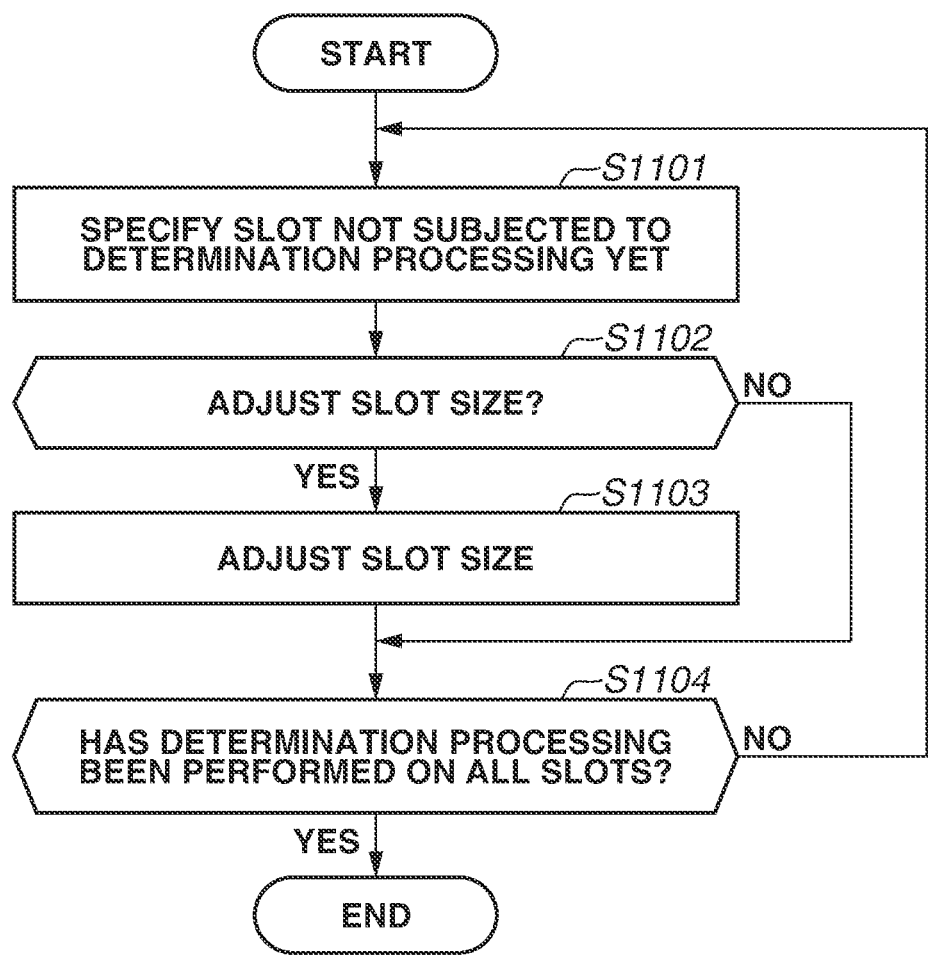
FIG. 11 is a flowchart illustrating slot adjustment processing that is performed by the album generation application.

Specifically, after the generation of the template L (or R) by laying out the slot area in the layout area, the CPU 101 performs processing illustrated in FIG. 11. FIG. 11 is a flowchart illustrating slot adjustment processing performed by the album generation application according to the present exemplary embodiment. The flowchart illustrated in FIG. 11 is implemented, for example, by the CPU 101 reading the program corresponding to the album generation application stored in the HDD 104 into the RAM 103 and executing the program. The flowchart illustrated in FIG. 11 is started after the slot area is laid out in the layout area. The processing in the case where the template L is generated will be described below. In the case where the template R is generated, the processing is performed on the template R instead of the template L.

In step S1101, the CPU 101 specifies, from among the slots included in the generated template L, a slot not subjected to determination processing in the subsequent stage yet. The CPU 101 also specifies the position of the specified slot in the template L.

In step S1102, the CPU 101 determines whether to adjust the size of the slot specified in step S1101. Specifically, the CPU 101 determines whether a specific side of the slot specified in step S1101 is arranged within a predetermined distance from a predetermined side of the template L. The specific side refers to a side substantially parallel to the predetermined side. In the present exemplary embodiment, the slot size is adjusted not only in a case where the specific side is arranged inside and near the predetermined side of the template L but also in a case where the specific side is arranged outside and near the predetermined side of the template L. In a case where the determination is yes (YES in step S1102), the processing proceeds to step S1103. In a case where the determination is no (NO in step S1102), the processing proceeds to step S1104.

Figure 12A:
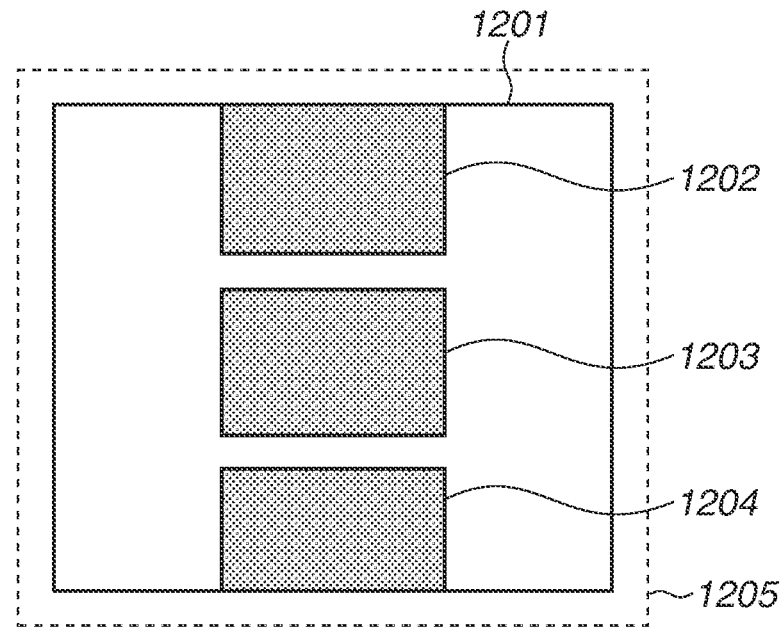
FIGS. 12A and 12B are diagrams for describing a slot adjustment.
Figure 12B:
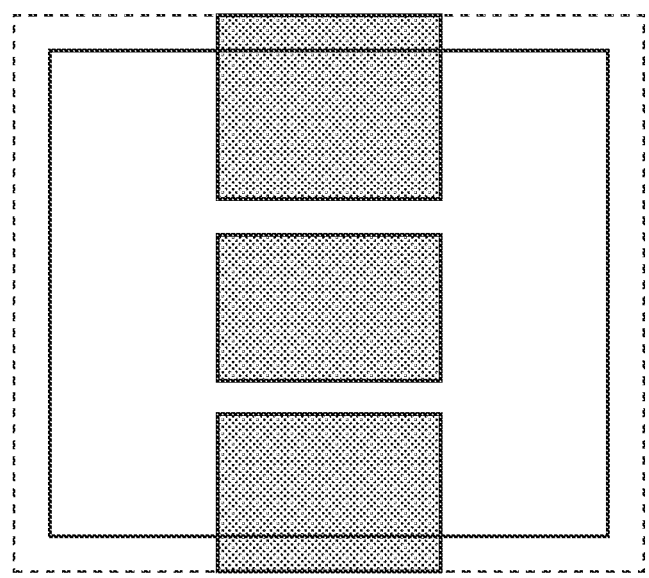

In step S1103, the CPU 101 adjusts the size of the slot specified in step S1101. Specifically, the CPU 101 scales up the slot by moving the position of the specific side of the slot to an area outside the template L. More specifically, for example, in a case where a template 1201 illustrated in FIG. 12A is generated as the template L, slots 1202 and 1204 located near ends of the template L are scaled up to generate a template illustrated in FIG. 12B. A slot 1203 not located near an end of the template L is not scaled up. An area 1205 is set in consideration of the possible size of errors in the cutting position during album generation. In a case where a slot is adjusted, the specific side of the slot is moved to the position of the area 1205. This can prevent the occurrence of a blank even in a case where an error occurs in the cutting position during album generation. The area(s) where a slot or slots is/are laid out outside the template will be printed. While the CPU 101 extends such slots only in one direction, the CPU 101 may extend a slot in a plurality of directions in a case where the slot is arranged near a plurality of sides of the template.

In step S1104, the CPU 101 determines whether the determination processing of step S1102 has been performed on all the slots. In a case where the determination is no (NO in step S1104), the processing returns to step S1101. In a case where the determination is yes (YES in step S1104), the processing of this flowchart ends, and the processing proceeds to step S705.

In step S705, the CPU 101 generates a template by laying out slots in widthwise alignment based on the two-dimensional array specified in step S703. Details of this processing will now be described.

Figure 8B:
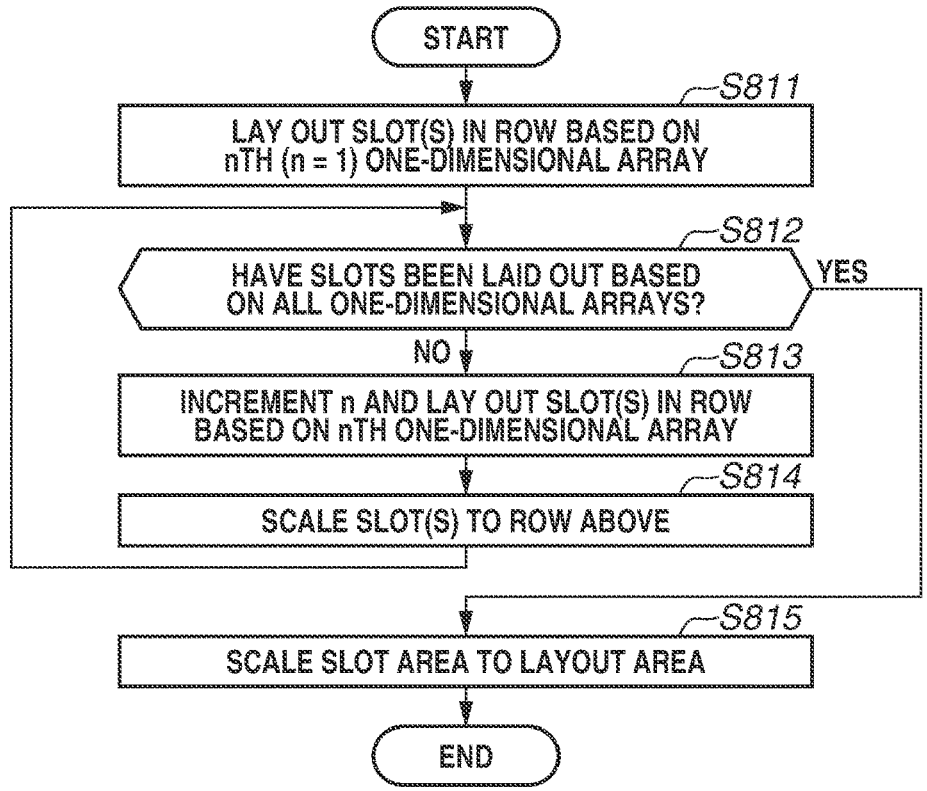

FIG. 8B is a flowchart illustrating template generation processing in widthwise, performed by the album generation application according to the present exemplary embodiment. The flowchart illustrated in FIG. 8B is implemented, for example, by the CPU 101 reading the program corresponding to the album generation application stored in the HDD 104 into the RAM 103 and executing the program. The flowchart illustrated in FIG. 8B illustrates the processing corresponding to step S705.

Figure 9B:
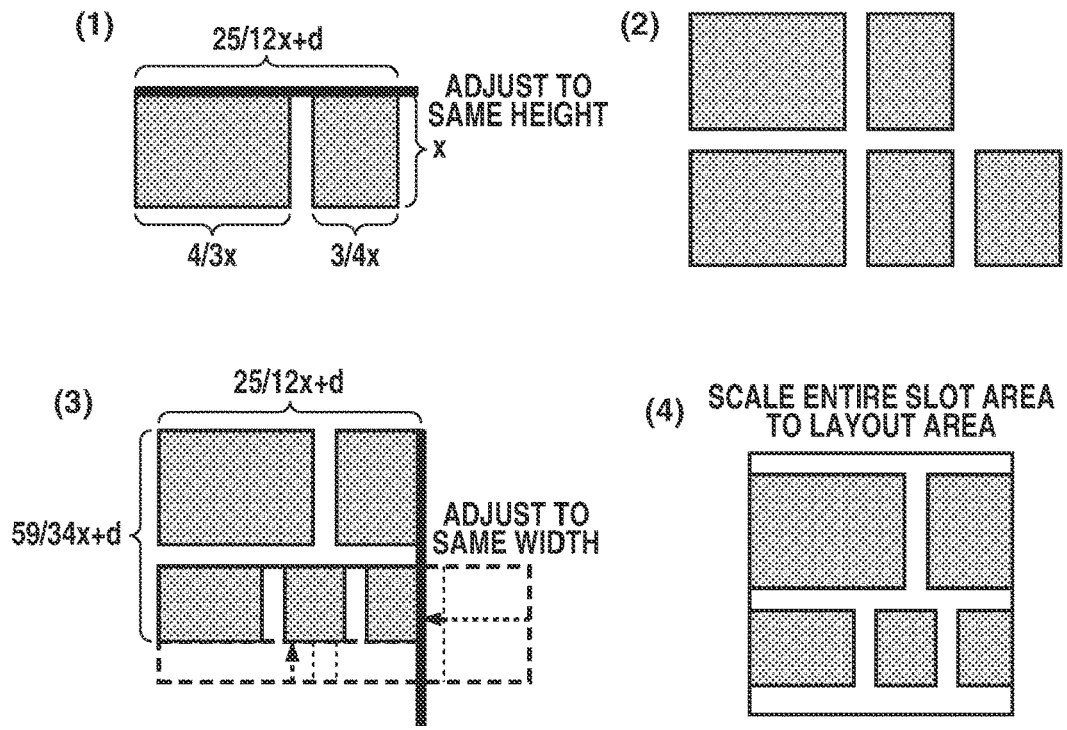

In step S811, the CPU 101 generates a slot area by laying out a slot or slots having the aspect ratio(s) included in an nth one-dimensional array in the two-dimensional array specified in step S703 in order from the left. Since n has an initial value of 1, the CPU 101 here lays out the slot(s) having the aspect ratio(s) included in the first one-dimensional array on the slot area. In a case where a plurality of slots is laid out, a predetermined width d of blank is interposed between the slots. Moreover, in a case where a plurality of slots is laid out, the CPU 101 scales the slots without changing the aspect ratios so that the added slots have the same height. Specifically, the CPU 101 scales the slots so that the added slots have a predetermined height. In a case where the two-dimensional array specified in step S703 is {{4/3, 3/4}, {4/3, 3/4, 3/4}}, the first one-dimensional array is {4/3, 3/4}. Slots are thus laid out in the slot area as illustrated in FIG. 9B(1).

In step S812, the CPU 101 determines whether slots have been laid out based on all the one-dimensional arrays included in the two-dimensional array specified in step S703. In a case where the determination is yes (YES in step S812), the processing proceeds to step S815. In a case where the determination is no (NO in step S812), the processing proceeds to step S813.

In step S813, the CPU 101 increments the value of n, and lays out a slot or slots having the aspect ratio(s) included in the nth one-dimensional array in the two-dimensional array specified in step S703 in the row below the slot(s) previously laid out, in order from the left in a case where the two-dimensional array specified in step S703 is {{4/3, 3/4}, {4/3, 3/4, 3/4}}, the second one-dimensional array is {4/3, 3/4, 3/4}. Slots are thus laid out in the slot area as illustrated in FIG. 9B(2).

In step S814, the CPU 101 scales the slot(s) included in the row added in step S813 without changing the aspect ratio(s) so that the row added in step S813 has the same width as that of the row above the row added in step S813. In a case where the two-dimensional array specified in step S703 is {{4/3, 3/4}, {4/3, 3/4, 3/4}}, the slots are laid out in the slot area as illustrated in FIG. 9B(3). Then, the processing returns to step S812.

In step S815, the CPU 101 scales the slot area generated by the processing of steps S811 to S814 to the layout area of the template type specified in step S603. The slot area is thereby scaled as illustrated in FIG. 9B(4). The CPU 101 lays out the scaled slot area in the layout area. In a case where the present processing is the processing included in the generation processing of the template L, the slot area is scaled to the layout area of the template L and laid out in the layout area of the template L. Meanwhile, in a case where the present processing is the processing included in the generation processing of the template R, the slot area is scaled to the layout area of the template R and laid out in the layout area of the template R. In such a manner, the template L or R is generated by widthwise alignment. The processing of this flowchart ends, and the processing proceeds to step S706.

In the present exemplary embodiment, templates are generated by both the lengthwise and widthwise alignment methods. A plurality of templates having respective different numbers of slot columns and a plurality of templates having respective different numbers of slot rows can thereby be generated.

In step S706, the CPU 101 determines templates have been generated based on all the two-dimensional arrays. In a case where the determination is yes (YES in step S706), the processing proceeds to step S707. In a case where the determination is no (NO in step S706), the processing returns to step S703. In step S703, the CPU 101 specifies a new two-dimensional array.

In step S707, the CPU 101 determines whether there are redundant templates among the templates generated in step S704 and the templates generated in step S705. In a case where there are redundant templates, the CPU 101 deletes either one of the templates.

After generation of the templates L and R as described above, the processing proceeds to step S608.

In step S608, the CPU 101 generates a spread template or templates. For example, in a case where the template type specified in step S603 is one not including a slot laid out across both the left and right pages, and a template L and a template R have been generated, the CPU 101 generates a spread template by connecting the template L with the template R. FIG. 10A illustrates an example of the spread template thus generated. In a case where a plurality of templates L and a plurality of templates R have been generated, the CPU 101 connects each of the plurality of templates L with each of the plurality of templates R. In other words, by the present processing, the CPU 101 generates as many spread templates as the number of templates L× the number of templates R.

Figure 10B:
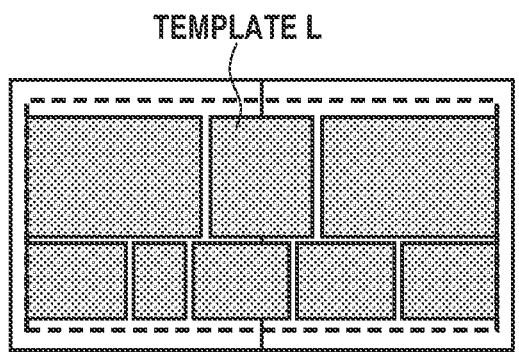
Figure 10C:
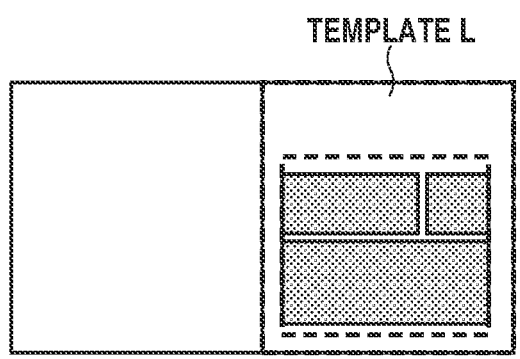
Figure 10D:
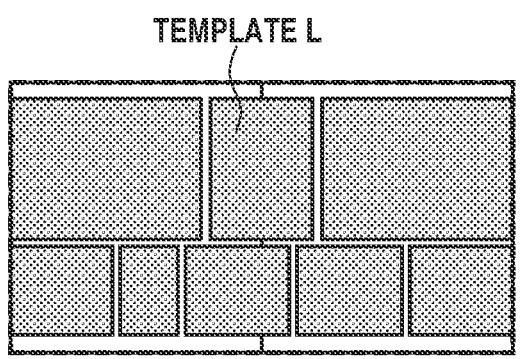

As another example, in a case where the template type specified in step S603 is one where a slot laid out across both the left and right pages can be laid out and not a fixed slot, and also as another example, in a case where the template type specified in step S603 is one where slots are laid out only on the right page without a slot on the left page, the CPU 101 generates the template(s) L as the spread template(s) since only a template or templates L is/are generated. Spread templates, for example, illustrated in FIGS. 10B, 10C, and 10D are generated in such a manner.

Figure 10E:
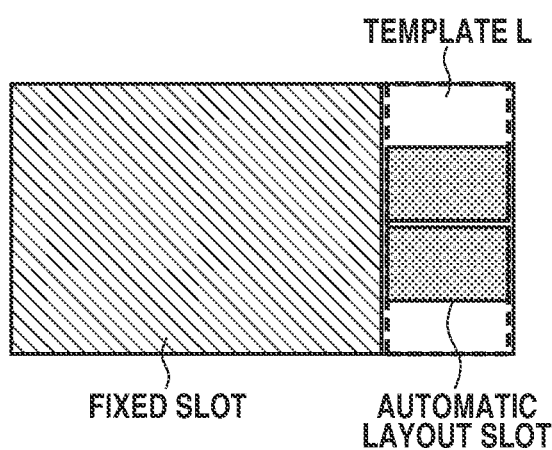
Figure 10F:
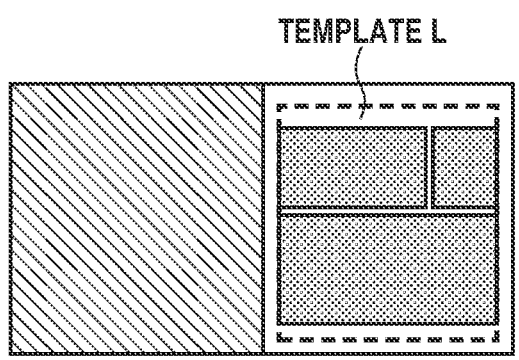

As yet another example, in a case where the template type specified in step S603 is one including a fixed slot. In such a case, the CPU 101 generates a spread template or templates by connecting the template(s) L with the fixed slot since only a template or templates L is/are generated. Spread templates, for example, illustrated in FIGS. 10E and 10F are generated in such a manner.

In step S609, the CPU 101 determines whether all the division results have been used for template generation. In a case where the determination is yes (YES in step S609), the processing proceeds to step S610. In a case where the determination is no (NO in step S609), the processing returns to step S605. The CPU 101 then generates templates by using a division result not specified yet.

In step S610, the CPU 101 determines whether all the template types have been specified. In a case where the determination is yes (YES in step S610), the processing of this flowchart ends. In a case where the determination is no (NO in step S610), the processing returns to step S603. In step S603, the CPU 101 specifies a template type not specified yet.

When the template generation processing is completed as described above, the processing proceeds to step S410.

In step S410, the CPU 101 performs template scoring. The template scoring refers to processing (scoring processing) for giving scores to the templates generated in step S409. Details of this processing will now be described. In the present exemplary embodiment, scoring is performed based on blank areas (areas other than slots) in the templates and the slots included in the templates.

In the present exemplary embodiment, the CPU 101 initially performs scoring based on blank areas, which refer to areas other than the slot area(s) in a template, by using Eq. (1):

$$\text{SCORE}_a = \begin{cases} 1 & (\text{AREA}_s > \text{THR}_{au}) \\ 0 & (\text{AREA}_s < \text{THR}_{al}) \\ \dfrac{\text{AREA}_s - \text{THR}_{al}}{\text{THR}_{au} - \text{THR}_{al}} & (\text{otherwise}) \end{cases} \quad \#(1)$$

$\text{SCORE}_a$ is the score based on the blank areas. $\text{AREA}_s$ is the total area of the slots included in the template. $\text{THR}_{au}$ and $\text{THR}_{al}$ are thresholds for determining the score based on the blank areas. If $\text{AREA}_s$ is greater than $\text{THR}_{au}$, $\text{SCORE}_a$ is 1. If $\text{AREA}_s$ is less than $\text{THR}_{au}$, $\text{SCORE}_a$ is 0. If $\text{AREA}_s$ is greater than or equal to $\text{THR}_{al}$ and less than or equal to $\text{THR}_{au}$, the value of $\text{SCORE}_a$ approaches 1 with increase in $\text{AREA}_s$, and the value of $\text{SCORE}_a$ approaches 0 with decreases in $\text{AREA}_s$. By the foregoing Eq. (1), the greater the total area of the slots (in other words, the smaller the total area of the blank areas), the higher score can be given to the template.

Figure 13A:
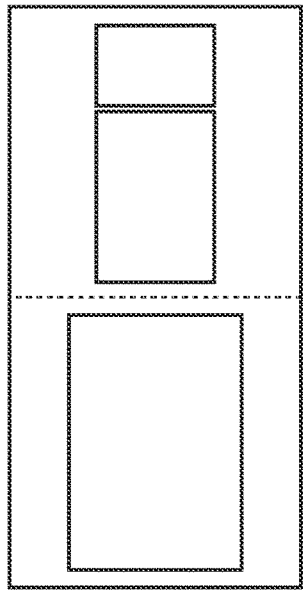
FIGS. 13A to 13F are diagrams for describing template types.
Figure 13C:
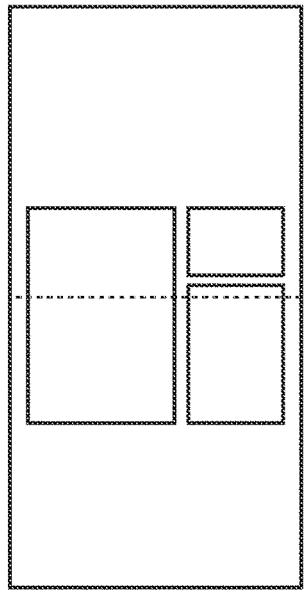
Figure 13E:
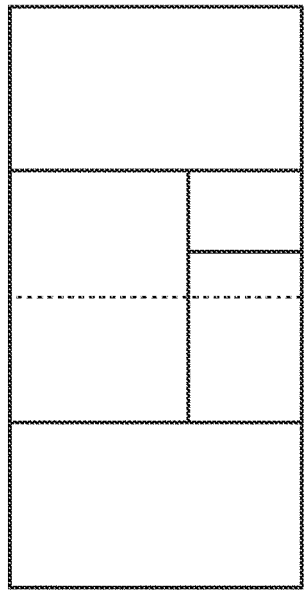
Figure 13B:
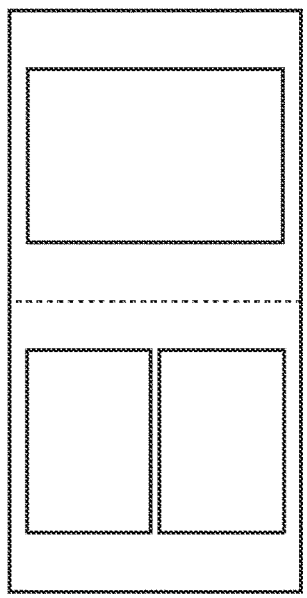
Figure 13D:
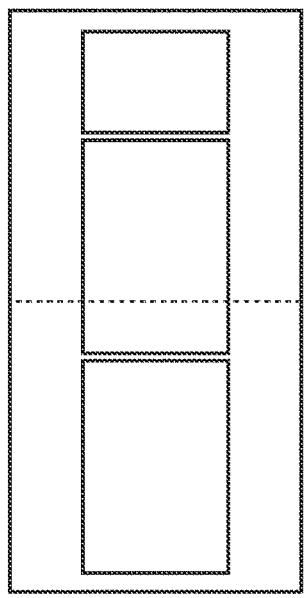
Figure 13F:
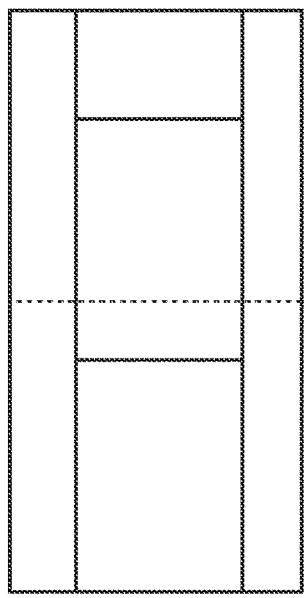

The scoring method based on the blank areas is not limited to the foregoing. For example, in the foregoing description, the CPU 101 gives a score to a spread template. However, for example, in a case where the template to be evaluated includes a template L and a template R, the CPU 101 may give scores to the respective templates L and R, and give the average of the scores to the spread template. In addition, scoring may be controlled based on the positions of the blank areas. For example, in a case of a laterally long template including blanks in the upper and lower parts (for example, see FIG. 13E) and a laterally long template including blanks in the left and right parts (for example, see FIG. 13F), the amount of blanks in the latter template appears to the user to be greater than the amount of blanks in the former template even in a case where the templates have the same blank area. $\text{THR}_{au}$ that is used for the scoring of a template including blanks in the upper and lower parts may therefore be controlled to be higher than $\text{THR}_{au}$ that is used for the scoring of a template including blanks in the left and right parts. Moreover, $\text{THR}_{al}$ that is used for the scoring of a template including blanks in the upper and lower parts may be controlled to be higher than $\text{THR}_{al}$ that is used for the scoring of a template including blanks in the left and right parts. Even in a case where a template including blanks in the left and right parts and a template including blanks in the upper and lower parts have the same blank area, the score given to the former is thereby controlled to be lower than that to the latter.

Next, the CPU 101 performs scoring based on slots by using Eqs. (2) and (3):

$$\text{SCORE}_g = \begin{cases} 1 & (\text{RATIO}_s < \text{THR}_{gl}) \\ 0 & (\text{RATIO}_s > \text{THR}_{gu}) \\ \dfrac{\text{THR}_{gu} - \text{RATIO}_s}{\text{THR}_{gu} - \text{THR}_{gl}} & (\text{otherwise}) \end{cases} \quad \#(2)$$

$$\text{RATIO}_s = \dfrac{\text{AREA}_S/N_S}{\text{AREA}_m} \quad \#(3)$$

$N_s$ is the total number of slots included in a template. $\text{AREA}_m$ is the area of the smallest slot among the slots included in the template. In other words, $\text{RATIO}_s$ is the ratio of an average area of the slots included in the template to the area of the smallest slot among the slots included in the template.

$\text{SCORE}_g$ is the score based on the slots. $\text{THR}_{gu}$ and $\text{THR}_{gl}$ are thresholds for determining the score based on the slots, $\text{SCORE}_g$. If $\text{RATIO}_s$ is higher than $\text{THR}_{gu}$, $\text{SCORE}_g$ is 0. If $\text{RATIO}_s$ is lower than $\text{THR}_{gl}$, $\text{SCORE}_g$ is 1. If $\text{RATIO}_s$ is higher than or equal to $\text{THR}_{gl}$ and lower than or equal to $\text{THR}_{gu}$, the value of $\text{SCORE}_g$ approaches 1 as $\text{RATIO}_s$ decreases, and the value of $\text{SCORE}_g$ approaches 0 as $\text{RATIO}_s$ increases. In other words, by the foregoing Eqs. (2) and (3), the smaller the difference between the area of the smallest slot among the slots included in the template and the average area of the slots included in the template is, the higher score can be given to the template.

The CPU 101 then calculates an average of $\text{SCORE}_a$ and $\text{SCORE}_g$, and gives the template the average as the final template score. In such a manner, scoring can be performed on the template from a plurality of viewpoints.

For example, in a case where four pieces of image data expressing images having an aspect ratio of 2/3 are selected as image data to be laid out on the spread specified in step S408. Suppose also that six templates illustrated in FIG. 14A are generated in step S409, for example, the CPU 101 manages the scores given to the respective templates as illustrated in FIG. 14B. With this configuration, templates (1) and (4) have the highest template score, and template (6) has the lowest template score.

In the present exemplary embodiment, the average of $\text{SCORE}_a$ and $\text{SCORE}_g$ is used as the template score. However, such a configuration is not restrictive. At least either one of $\text{SCORE}_a$ and $\text{SCORE}_g$ may be assigned a weight, and the weighted average of $SCORE_a$ and $SCORE_g$ may be used as the template score. As another example, the lower of $SCORE_a$ and $SCORE_g$ may be used as the template score.

To calculate the template score, scores other than $SCORE_a$ and $SCORE_g$ may be referred to. For example, a score $SCORE_m$ based on margins between slots may be referred to. A layout image where the position of a margin in a column is too close to that of a margin in the next column is undesirable in terms of finished quality. The CPU 101 may therefore calculate a distance between margins in the template, and give the score $SCORE_m$ based on the distance. Specifically, for example, the CPU 101 calculates a distance between a margin in a column and a margin in the next column in the template (such as distances 1401 and 1402 in FIG. 14C), and gives $SCORE_m$ based on the distance. For example, the greater the distance, the greater the value of $SCORE_m$. The smaller the distance, the smaller the value of $SCORE_m$. In a case where, for example, a plurality of distances is calculated as in FIG. 14C, $SCORE_m$ is calculated based on the average distance.

Figure 15:
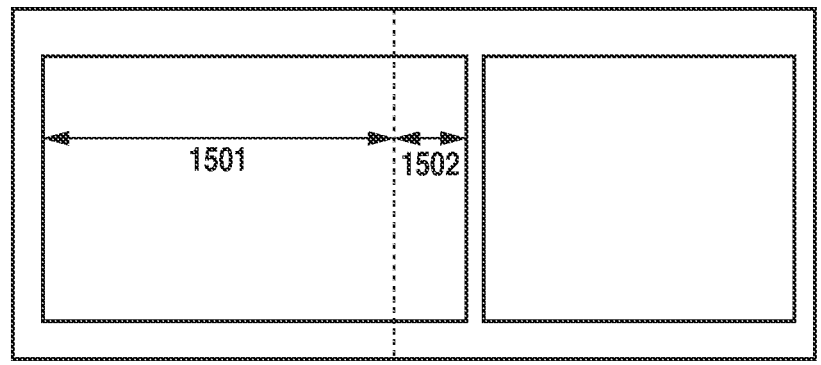
FIG. 15 is a diagram for describing the template scoring.

Alternatively, a score $SCORE_s$ based on a distance from the center line of a spread to a side of a slot crossing the center line of the spread may be referred to. For example, as illustrated in FIG. 15, a layout image where a side of a slot crossing the center line of the spread is too close to the center line of the spread is undesirable in terms of finished quality. The CPU 101 may therefore calculate a distance from the center line of the spread to a side of a slot crossing the center line of the spread, and give $SCORE_s$ based on the distance. Specifically, for example, the CPU 101 calculates a distance from the center line of the spread to a side of the slot (for example, distances 1501 and 1502 in FIG. 15). The CPU 101 then gives $SCORE_g$ based on the distance. For example, $SCORE_g$ has a small value when the distance is less than or equal to a predetermined threshold, and a large value when the distance is greater than the predetermined threshold.

In a case where scores other than $SCORE_a$ and $SCORE_g$ are calculated, an average of all the calculated scores is given to the template as a template score.

In step S410, the CPU 101 may switch evaluation methods based on the type of template to be evaluated. Specifically, for example, the CPU 101 may switch which score(s) to calculate from among $SCORE_a$, $SCORE_g$, $SCORE_m$, and $SCORE_s$ based on the type of template to be evaluated. Specifically, for example, the CPU 101 may give a type of template not including a slot crossing the center line of the spread a template score by using only $SCORE_a$, $SCORE_g$, and $SCORE_m$. The CPU 101 may give a type of template including a slot crossing the center line of the spread a template score by using all the scores. A method for determining the type of template will be described in detail below with reference to FIGS. 13A to 13F.

The CPU 101 initially determines whether the template to be evaluated includes a slot crossing the center line of the spread. Specifically, the CPU 101 determines whether the four corner points of each slot are all included in either one of the left and right pages. In a case where the corner points of each slot are all included in either one of the left and right pages, the template is determined to be of type not including a slot crossing the center line of the spread (for example, see FIGS. 13A and 13B). On the other hand, in a case where the corner points of a slot are not all included in either one of the left and right pages, the template is determined to be of type including a slot crossing the center line of the spread (for example, see FIGS. 13C to 13F). In a case where a slot has a polygonal shape other than a rectangle shape, the CPU 101 determines whether the points corresponding to the corners of the polygonal shape are all included in either one of the left and right pages, instead of the four points.

Next, the CPU 101 determines whether the template to be evaluated includes a slot touching an end of the template. Specifically, the CPU 101 determines whether any of the corner points of the slots is at an end of the template or outside the template. In a case where any of the corner points of the slots is at an end of the template or outside the template, the template is determined to be of type including a slot touching an end of the template (for example, see FIGS. 13E and 13F). Meanwhile, in a case where none of the corner points of the slots is at an end of the template or outside the template, the template is determined to be of type not including a slot touching an end of the template (for example, see FIGS. 13A to 13D). This determination result is used in determining whether to perform the foregoing control of making $THR_{au}$ used for the scoring of a template including blanks in the left and right parts and $THR_{au}$ used for the scoring of a template including blanks in the upper and lower parts different. Specifically, for example, such a control is determined to be performed on a type of template including a slot touching an end of the template, and to not be performed on a type of template not including a slot touching an end of the template.

In step S411, the CPU 101 selects one or a plurality of templates from the templates generated in step S409 based on the evaluations (template scores) given in step S410. In the present exemplary embodiment, the CPU 101 selects, from among the templates generated in step S409, all templates having a template score higher than or equal to a predetermined threshold. In a case where there is no template having a template score higher than or equal to the predetermined threshold, the CPU 101 selects a template having the highest template score from among the templates generated in step S409. The method for selecting the template(s) is not limited to the foregoing. For example, while the foregoing threshold is described to have a fixed value, a value obtained by subtracting a predetermined value from the template scores given to the templates generated in step S409 may be determined as the threshold. As another example, the CPU 101 may select, from among the templates generated in step S409, templates up to a predetermined number or ratio in descending order of the template scores.

In this processing, the CPU 101 may control selection of similar templates. For example, in a case where a template s1 having the highest template score is selected from among all the templates. In such a case, the CPU 101 deletes all templates having a high degree of similarity to the template s1 from the templates to be selected. The degree of similarity is calculated, for example, based on average coordinates of the center points of the slots included in the respective templates. In a case where for example, the template s1 includes two slots, and the coordinates of the center points of the slots are (1, 5) and (3, 11). In such a case, average coordinates $P_{s1}$ of the center points of the slots in the template s1 are (2, 8). A degree of similarity between the template s1 and a template s2 is calculated by $|P_{s1}-P_{s2}|$. $P_{s2}$ represents average coordinates of the center points of the slots in the template s2. In a case where $|P_{s1}-P_{s2}|$ is less than a predetermined threshold, the degree of similarity between the templates s1 and s2 is determined to be high. In a case where $|P_{s1}-P_{s2}|$ is greater than the predetermined threshold, the degree of similarity between the templates s1 and s2 is determined to be low. In such a manner, the CPU 101 determines and deletes templates having a high degree of similarity to a selected template. After the templates having a high degree of similarity to the selected template are deleted, the CPU 101 selects a new template. Each time a template is subsequently selected, the CPU 101 determines and deletes templates having a high degree of similarity to the selected template. Such a configuration prevents some of the templates from being used for layout image generation processing to be described below, whereby the time for the layout image generation processing can be reduced.

In step S412, the CPU 101 generates a layout image by allocating the piece(s) of image data assigned to the spread specified in step S408 to the slot(s) in the template selected in step S411 (layout image generation processing). In a case where a plurality of templates is selected in step S411, the CPU 101 here specifies, from among the templates selected in step S411, a template on which the image data is not laid out yet. The CPU 101 then lays out the image data on the template thus specified. Details of the method for laying out the image data will be described below with reference to FIGS. 16A to 16E.

FIG. 16A illustrates an example of the shapes of images expressed by the image data to be laid out on the spread specified in step S408. FIG. 16B illustrates an example of the template on which the image data is laid out. FIG. 16C illustrates a table showing information about the pieces of image data corresponding to FIG. 16A and a table showing the information about the slots included in the template corresponding to FIG. 16B. Information about each piece of image data includes, for example, an image number assigned to the piece of image data and the aspect ratio, score (image score), and imaging time of the piece of image data. Information about each slot includes, for example, a slot number assigned to the slot and the aspect ratio, score (slot score), and position of the slot. The information about the position of the slot is expressed by an integer, for example. Slots on the left of the template are assigned lower numbers. The CPU 101 initially sorts the table contents based on the aspect ratios. In a case where there are rows having the same aspect ratio, the CPU 101 controls the sort order so that a row with an earlier imaging time or lower position number comes above. FIG. 16D illustrates an example of the resulting tables. The CPU 101 then allocates the pieces of image data to the slots corresponding to the same order of rows in the tables. Specifically, in the example of FIG. 16D, the image data having an image number of 1 is allocated to the slot having a slot number of 2, the image data having an image number of 2 is allocated to the slot having a slot number of 1, and the image data having an image number of 3 is allocated to the slot having a slot number of 3. In allocating a piece of image data to a slot, the image data is scaled as appropriate so that at least one side of the image data touches the corresponding side of the slot. In a case where part of the scaled image data protrudes from the slot, the protruding part is trimmed off. However, according to the present exemplary embodiment, the trimmed part can be reduced in size since the slot shape is based on the aspect ratio of the piece of image data. FIG. 16E illustrates an example of the resulting layout image generated.

In step S413, the CPU 101 performs scoring on the layout images generated in step S412. The layout image scoring will be described in detail below with reference to FIG. 17A to 17C.

For example, suppose that image data is laid out on templates illustrated in FIGS. 17A and 17B in the layout image generation processing in step S412. A table 1701 illustrated in FIG. 17C is a table of information about the pieces of image data to be laid out on the spread specified in step S408. A table 1702 is a table of information about the slots in template 1 illustrated in FIG. 17A. A table 1703 is a table of information about the slots in template 2 illustrated in FIG. 17B. Each table is sorted as described in step S412. In the layout image scoring, the CPU 101 calculates the score of a layout image based on degrees of correlation between information about the pieces of image data laid out in the layout image and information about the slots to which the pieces of image data are allocated. Specifically, the CPU 101 initially calculates a degree of score correlation between the ranks of the image scores of the pieces of image data and the ranks of the slot scores of the slots, and a degree of position correlation between the ranks of the imaging times of the pieces of image data and the ranks of the positions of the slots. The CPU 101 then gives a score to the layout image based on the degrees of correlation. For example, the score of the layout image increases with increase in the degrees of correlation. The score of the layout image decreases with decrease in the degrees of correlation. One of the reasons is that finished quality of the layout image improves in a case where, for example, the piece of image data having the highest image score among those to be laid out on the spread specified in step S408 is allocated to the slot having the highest slot score. Another reason is that finished quality of the layout image improves in a case where, for example, the piece of image data having the earliest imaging time among those to be laid out on the spread specified in step S408 is allocated to the slot at the leftmost position. In the examples illustrated in FIG. 17A to 17C, the layout image using template 1 and the layout image using template 2 have the same degree of score correlation. However, the layout image using template 2 has a higher degree of position correlation than that of the layout image using template 1. Thus, the layout image using template 2 is given a score higher than that of the layout image using template 1.

In step S414, the CPU 101 determines whether layout images have been generated based on all the templates selected in step S411. In a case where the determination is yes (YES in step S414), the processing proceeds to step S415. In a case where the determination is no (NO in step S414), the processing returns to step S412. In step S412, the CPU 101 specifies a template not used to generate a layout image yet, and generates a layout image based on the specified template.

In step S415, the CPU 101 selects, from among the layout images generated in step S412, a layout image to be laid out on the spread specified in step S408 and displayed on and output to the spread display section 503. In the present exemplary embodiment, the CPU 101 selects the layout image based on the scores given in step S410 and the scores given in step S413. Specifically, the CPU 101 selects a layout image having the highest total of scores given in steps S410 and S413. For example, in a case where a template used to generate a layout image A has a score of 70 (score given in step S410), and the layout image A has a score of 80 (score given in step S413). Also, in a case where a template used to generate a layout image B has a score of 90 (score given in step S410) and the layout image B has a score of 70 (score given in step S413). In such a case, the layout image B is selected by priority over the layout image A. However, such a configuration is not restrictive. For example, the CPU 101 may assign a weight to at least either one of the scores given in step S410 and S413, and perform the selection by giving priority to either one of the scores given in steps S410 and S413. Alternatively, the CPU 101 may perform the selection based on either one of the scores given in steps S410 and S413. In such a manner, a layout image to be actually laid out on the spread is selected from among a plurality of layout images.

In step S416, the CPU 101 determines whether all the spreads have been specified to generate layout images for all the spreads. In a case where the determination is yes (YES in step S416), the processing proceeds to step S417. In a case where the determination is no (NO in step S416), the processing returns to step S408. In step S408, the CPU 101 specifies a new spread, and then generates a layout image to be laid out on the spread.

In step S417, the CPU 101 displays the layout images selected in step S415 on the edit screen 501. Specifically, the CPU 101 displays the spreads and the layout images laid out on the spreads in the spread list 502. In a case where one of the spreads is selected from the spread list 502, the CPU 101 displays the selected spread and the layout image laid out on the selected spread in an enlarged manner on the spread display section 503, and enables acceptance of editing operations on the selected spread. The processing ends.

With such a configuration, layout images can be generated by using appropriate templates.

<Editing of Album Data>

The automatic layout processing to be performed when an editing operation on album data is performed on the edit screen 501 will be described. The edit screen 501 is displayed in a case where manual generation is selected as the generation method of album data or in a case where the processing illustrated in FIG. 4 is completed. While the edit screen 501 is displayed, the user can edit the layout image laid out on the spread selected from the spread list 502 as appropriate. Specifically, for example, the user can perform editing operations to add one or a plurality of pieces of image data to the layout image laid out on the spread selected from the spread list 502 or change one or a plurality of pieces of image data already laid out in the layout image. In the present exemplary embodiment, the automatic layout processing can be performed not only in the processing illustrated in FIG. 4 but also in a case where image data to be laid out on the spread is added by editing operations. In the present exemplary embodiment, the automatic layout processing is not performed in a case where the image data already laid out in the layout image is changed by editing operations. More specifically, new image data is allocated to the shot(s) where the image data to be changed has been allocated without changing the size, shape, or position of the slot(s). However, such a configuration is not restrictive, and the automatic layout processing may also be performed in a case where the image data already laid out in the layout image is changed by editing operations. More specifically, new templates may be generated again to generate a layout image based on the image data already laid out except that to be changed, and the new image data to be laid out by the change.

Figure 18:
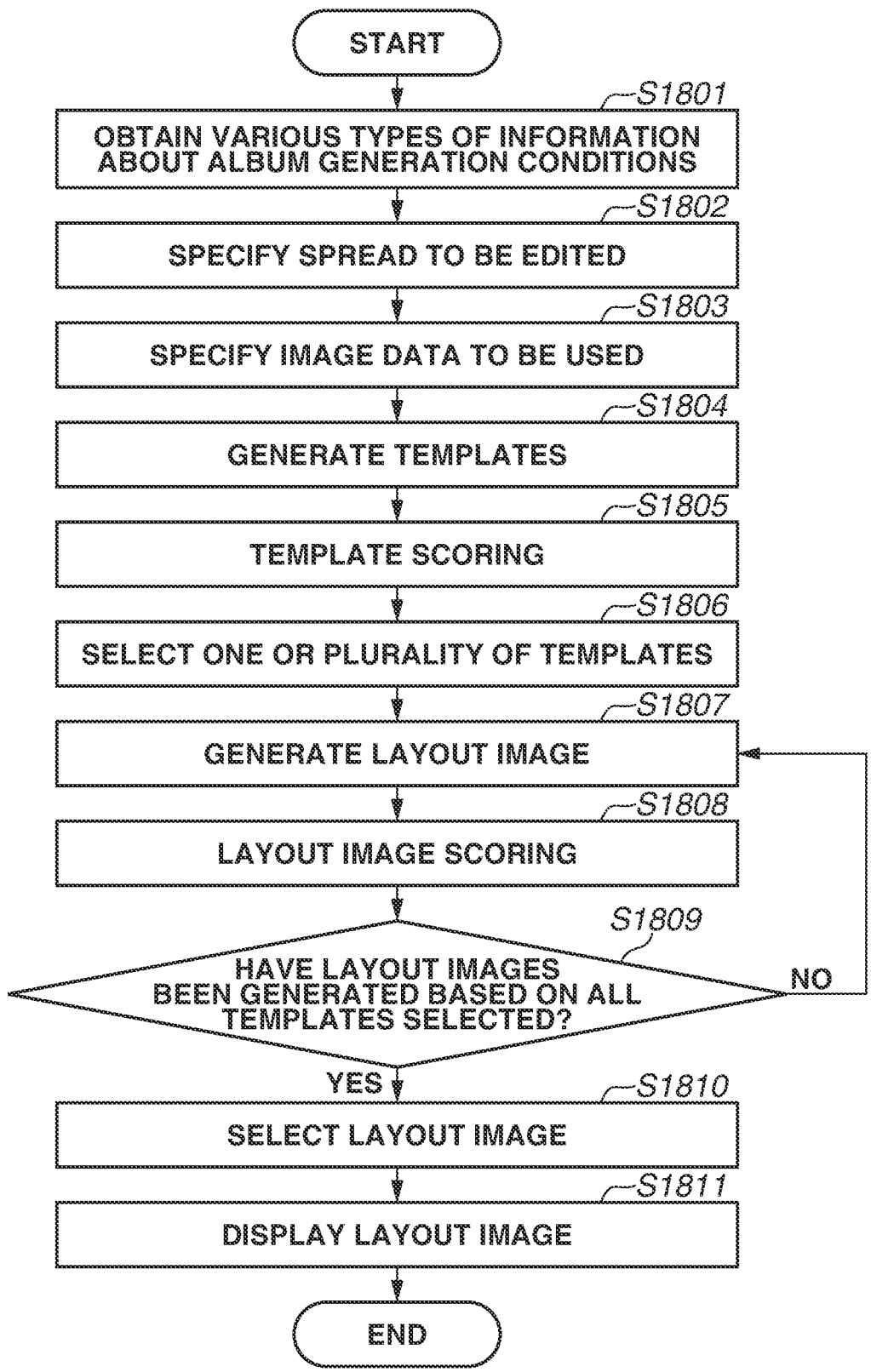
FIG. 18 is a flowchart illustrating automatic layout processing that is performed by the album generation application during editing.

FIG. 18 is a flowchart illustrating the automatic layout processing that is performed by the album generation application during editing according to the present exemplary embodiment. The flowchart illustrated in FIG. 18 is implemented, for example, by the CPU 101 reading the program corresponding to the album generation application stored in the HDD 104 into the RAM 103 and executing the program. The flowchart illustrated in FIG. 18 is started in a case where an editing operation on album data is performed on the edit screen 501. Specific examples of the editing operation include an operation for adding image data to be laid out on the spread displayed on the spread display section 503.

In step S1801, the CPU 101 obtains various types of information about the album generation conditions input to the input screen 301.

In step S1802, the CPU 101 specifies the spread displayed on the spread display section 503 as the spread to be edited.

In step S1803, the CPU 101 specifies image data to be used for editing. Specifically, the CPU 101 specifies the image data having been laid out on the spread displayed on the spread display section 503 before the acceptance of the editing operation, and new image data for which an addition instruction is given by the editing operation. No image data is laid out on the spread immediately after the edit screen 501 is displayed by selection of manual generation as the generation method of the album data. In a case where an addition instruction for image data is given with no image data laid out on the spread, the CPU 101 then specifies only the new image data for which the addition instruction is given by the editing operation. The CPU 101 obtains feature amounts of the image data specified here.

In step S1804, the CPU 101 generates templates to be used for the automatic layout of the spread specified in step S1802. Details of this processing are similar to those of step S409 except in some points. The differences are described below.

In step S601 of the automatic layout processing performed based on an instruction for automatic generation, the pieces of image data are sorted in time-series order. By contrast, in step S601 of the automatic layout processing performed based on an editing operation, the CPU 101 initially sorts the pieces of image data having been laid out on the spread in the layout order on the spread. The CPU 101 then arranges the piece(s) of new image data for which the addition instruction is given to come after the pieces of image data sorted based on the layout order on the spread. However, such a configuration is not restrictive. The CPU 101 may sort the pieces of image data in time-series order again as in the automatic layout processing performed based on an instruction for automatic generation.

In step S1805, the CPU 101 performs template scoring. Details of this processing are similar to those of step S410.

In step S1806, the CPU 101 selects one or a plurality of templates from among the templates generated in step S1804 based on the evaluations (scores) given in step S1805. Details of this processing are similar to those of step S411.

In step S1807, the CPU 101 generates a layout image by allocating the pieces of image data corresponding to the spread specified in step S1802 to the slots in a template selected in step S1806. Details of this processing are similar to those of step S412.

In step S1808, the CPU 101 performs scoring on the layout image generated in step S1807. Details of this processing are similar to those of step S413.

In step S1809, the CPU 101 determines whether layout images have been generated based on all the templates selected in step S1806. In a case where the determination is yes (YES in step S1809), the processing proceeds to step S1810. In a case where the determination is no (NO in step S1809), the processing returns to step S1807. In step S1807, the CPU 101 specifies a template not used to generate a layout image yet, and generates a layout image based on the specified template.

In step S1810, the CPU 101 selects a layout image to be laid out on the spread specified in step S1802, from among the layout images generated in step S1807. Details of this processing are similar to those of step S415.

In step S1811, the CPU 101 displays the layout image selected in step S1810 on the spread display section 503.

With such a configuration, a layout image can be generated by using an appropriate template even in the automatic layout processing that is performed based on an editing operation.

In the present exemplary embodiment, the edit screen 501 can display candidate templates usable in editing the layout image displayed on the spread display section 503 in the candidate display area 506. By selecting one of the candidate templates, the user can change the layout image displayed on the spread display section 503 to one using the selected template. Examples of the template candidates displayed here include templates used for layout images that are generated in step S412 or S1807 and not selected in step S415 or S1810. In this processing, for example, the CPU 101 may display the templates used for the layout images that are generated in step S412 or S1807 and not selected in step S415 or S1810 in descending order of the template scores. Alternatively, for example, templates having high template scores may be extracted from the templates used for the layout images that are generated in step S412 or S1807 and not selected in step S415 or S1810. As a result of the extraction, only templates having high template scores may be controlled to be displayed and not templates having low template scores. As another example, templates other than those used for the layout images that are generated in step S412 or S1807 and not selected in step S415 or S1810 may be displayed. Specifically, for example, templates stored in the album generation application in advance may be displayed instead of the templates automatically generated based on the features of the image data selected by the user. In a case where, for example, some templates are deleted by the determination of the degree of similarity in step S411, such templates may be controlled to not be displayed in the candidate display area 506. This can prevent a plurality of similar candidate templates from being displayed in the candidate display area 506. By selecting one of the templates displayed in the candidate display area 506, the user can change the layout image laid out on the spread displayed on the spread display section 503 to one using the selected template. In this processing, in a case where the user selects a template used for a layout image that is generated in step S412 or S1807 and not selected in step S415 or S1810, the layout image has already been generated and the CPU 101 displays the already-generated layout image. Meanwhile, in a case where the user selects a template stored in the album generation application in advance, the CPU 101 performs the automatic layout processing using the template and displays the resulting layout image.

The candidate display area 506 may display layout information generated by the automatic layout processing using the candidate templates (i.e., candidate layout information), instead of the candidate templates. In such a case, the layout images generated in step S412 or S1807 and not selected in step S415 or S1810 are displayed in the candidate display area 506.

The user can switch a mode of the edit screen 501 from an automatic edit mode to a manual edit mode by performing a predetermined operation, such as pressing a not-illustrated button on the edit screen 501. In the automatic edit mode, in a case where image data is added to a spread, the processing illustrated in FIG. 18 is performed to automatically generate a layout image. In the manual edit mode, in a case where image data is added to a spread, the user manually specifies the layout position(s) and size(s) of the added image data to generate a layout image. The user can select a desired editing method by switching between these modes.

In a case where the layout images laid out on the spreads are thus edited, the layout information is also edited so that the edited layout images are output. After the editing, the user can order the album based on the edited layout information by pressing the order button 505.

In such a manner, the user can edit the album data and the layout information as appropriate even after the execution of the automatic layout processing.

Other Exemplary Embodiments

The present disclosure is not limited to the foregoing exemplary embodiment. While, in the foregoing exemplary embodiment, the foregoing processing for selecting images (image selection processing) is described to be used in the automatic layout processing of an album, for example, the image selection processing may be used for a presentation function of automatically presenting image data to be printed to the user. In other words, the foregoing image selection processing may be performed by a program for executing the presentation function. Alternatively, an exemplary embodiment of the present disclosure may be applied to a configuration for generating a single-sheet print product. In such a case, for example, the CPU 101 can process a single-sheet print product as a spread according to the foregoing exemplary embodiment. Since a single piece of image data is typically laid out on a single-sheet print product, templates for a single-sheet print product shall include only one slot each. In a case where the number of print products can be set scene by scene, the CPU 101 can process a set number of single-sheet print products as a spread according to the foregoing exemplary embodiment.

In the foregoing exemplary embodiment, the template generation processing generates a plurality of templates based on the features of image data for each spread or page. However, such a configuration is not restrictive. For example, only one template may be generated for a spread or page. In such a configuration, the template scoring may be omitted, for example.

While, in the foregoing exemplary embodiment, the template generation processing generates templates suitable to image data by determining the slot shapes based on the features of the image data, such a configuration is not restrictive. For example, the positions and sizes of slots in a template may be determined based on the features of the image data. Specifically, for example, a template may be generated by controlling slot positions and slot sizes so that a slot for image data expressing a large-sized image is laid out on the left page of the template. Yet another example, slots may be controlled so that a slot for image data expressing a large-sized image has a size greater than that of a slot for image data expressing a small-sized image.

In the foregoing exemplary embodiment, the processing for generating layout images in the automatic layout processing uses only new templates generated based on the features of image data. However, such a configuration is not restrictive. Layout images may be generated by using not only new templates generated but also templates stored in the album generation application in advance.

While, in the foregoing exemplary embodiment, a plurality of templates is generated based on the features of image data, and then the image data is allocated to slots included in each of the plurality of templates to generate a plurality of layout images. One of the plurality of layout images is then specified based on template scores, and the specified layout image is displayed, such a configuration is not restrictive. For example, one or a plurality of templates may be specified based on the template scores before the generation of layout images. One or a plurality of layout images then may be generated by using only the specified template(s). In a case where a plurality of layout images is generated, one of the layout images is specified as a layout image to be displayed on and output to the spread display section 503 in the manner described in step S415. Here, the one layout image may be specified by referring to or not referring to the template scores (i.e., only the scores of the layout images may be referred to).

While, in the foregoing exemplary embodiment, slots included in a new template generated based on the features of image data are laid out to not overlap with each other, such a configuration is not restrictive. Some of the slots may be laid out to overlap with each other.

While, in the foregoing exemplary embodiment, a description is given of the case where the image processing apparatus 100 performing the automatic layout processing is in a local environment, the image processing apparatus 100 may be on a network server, for example. In such a case, the user uploads image data to the image processing apparatus 100, and then the image processing apparatus 100 can perform the automatic layout processing.

While, in the foregoing exemplary embodiment, evaluations are performed by giving scores in the image scoring, the template scoring, and the layout image scoring, such a configuration is not restrictive. More specifically, evaluations may be performed without using scores. For example, evaluations may be performed in grades such as "S", "A", "B", and "C" in descending order. Scene classification and image selection may be performed based on the evaluations performed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplar embodiments. The scope of the following claims is to be accorded the broadest interpretation so as to encompass all such modifications and equivalent structures and functions.

This application claims the benefit of Japanese Patent Application No. 2019-146638, filed Aug. 8, 2019, which is hereby incorporated by reference herein in its entirety.

What is claimed is:

1. A method for controlling an image processing apparatus, comprising:
   specifying one or a plurality of pieces of image data;
   generating a new template based on a feature of the specified one or plurality of pieces of image data, the generated new template including at least one or a plurality of slots for which the specified one or plurality of pieces of image data are laid out;
   generating a layout image by laying out the specified one or plurality of pieces of image data to the one or plurality of slots included in the generated new template; and
   accepting an editing operation on the generated layout image(s) from a user;
   after the layout image(s) is/are generated, displaying one or a plurality of templates usable to edit the generated layout image(s); and
   in a case where the editing operation accepted from the user is intended to change a template used for the generated layout image(s), changing the generated layout image(s) to a layout image or images generated by using a template selected by the user from among the one or plurality of templates displayed,
   wherein a plurality of the new templates is generated based on a feature of the one or plurality of pieces of image data specified, and
   wherein one or a plurality of templates not used to generate the layout image(s) from among the generated plurality of the new templates is included in the one or plurality of templates usable to edit the generated layout image(s).

2. The method according to claim 1, wherein at least one of an aspect ratio(s) of the one or plurality of slots in the generated new template, a number of slots included in the generated new template generated, a size(s) of the one or plurality of slots in the generated new template, and a position(s) of the one or plurality of slots in the generated new template is specified based on the feature of the specified one or plurality of pieces of image data.

3. The method according to claim 1, wherein a plurality of the new templates is generated based on the feature of the specified one or plurality of pieces of image data.

4. The method according to claim 3, wherein the layout image is an image to be printed on a spread including two pages, and
   wherein the generated plurality of the new templates includes a type of template including a slot crossing a line corresponding to a center line of the spread and a type of template not including a slot crossing a line corresponding to the center line of the spread.

5. The method according to claim 3, wherein the generated plurality of the new templates includes a type of template including a slot not based on the feature of the specified one or plurality of pieces of image data and a type of template not including a slot not based on the feature of the specified one or plurality of pieces of image data.

6. The method according to claim 3, wherein the generated plurality of the new templates includes a type of template including a slot touching an end of the template and a type of template not including a slot touching an end of the template.

7. The method according to claim 3, wherein the generated plurality of the new templates includes a type of template including a blank in upper and lower parts of the template and a type of template including a blank in left and right parts of the template.

8. The method according to claim 3, wherein the generated plurality of the new templates includes a template including a predetermined number of slot columns and a template including a number of slot columns different from the predetermined number.

9. The method according to claim 3, wherein the generated plurality of the new templates includes a template including a predetermined number of slot rows and a template including a number of slot rows different from the predetermined number.

10. The method according to claim 3, further comprising:
evaluating the generated plurality of the new templates;
specifying any one of a plurality of the layout images based on evaluation on the generated plurality of the new templates, wherein the plurality of the layout images is generated by laying out the specified one or plurality of pieces of image data to the one or plurality of slots included in each of the generated plurality of the new templates; and
outputting the specified layout image,
wherein the generated plurality of the new templates is evaluated based on at least one of a feature about the slot(s), information about a blank area, and a feature about a margin between the slot(s), the blank area being an area other than the slot(s).

11. The method according to claim 3, further comprising:
evaluating the generated plurality of the new templates; and
specifying one or a plurality of templates from among the generated plurality of the new templates based on evaluation on the generated plurality of new templates,
wherein the generated plurality of the new templates is evaluated based on at least one of a feature about the slot(s), information about a blank area, and a feature about a margin between the slot(s), the blank area being an area other than the slot(s), and
wherein one or a plurality of the layout images is generated by allocating the specified one or plurality of pieces of image data to the one or plurality of slots included in each of the one or plurality of the templates specified from among the generated plurality of the new templates based on the evaluation on the generated plurality of the new templates.

12. The method according to claim 1, further comprising:
accepting an editing operation on the generated layout image(s) from a user,
wherein in a case where the accepted editing operation is intended to add one or a plurality of pieces of image data to the one or plurality of pieces of image data laid out on the generated layout image(s), a new template is generated based on the plurality of pieces of image data including the one or plurality of pieces of image data added by the editing operation, and
wherein a new layout image is generated by allocating the plurality of pieces of image data including the one or plurality of pieces of image data added by the editing operation to one or plurality of slots included in the new template generated based on the plurality of pieces of image data including the one or plurality of pieces of image data added by the editing operation.

13. The method according to claim 1,
wherein the one or a plurality of templates usable to edit the generated layout image(s) includes one or plurality of templates, which is a template stored in the image processing apparatus in advance and which is not a new template generated based on a feature of the one or plurality of pieces of image data specified.

14. The method according to claim 1, further comprising generating a plurality of different layout images, each with a different plurality of pieces of image data arranged, to generate album data for creating an album in which a plurality of different layout images are printed.

15. The method according to claim 14, further comprising executing a process for ordering an album created by the generated album data.

16. An image processing apparatus comprising:
a memory that stores a program; and
at least one processor that executes the program stored in the memory to perform:
specifying one or a plurality of pieces of image data;
generating a new template based on a feature of the specified one or plurality of pieces of image data, the generated new template including at least one or a plurality of slots for which the specified one or plurality of pieces of image data are laid out;
generating a layout image by laying out the specified one or plurality of pieces of image data to the one or plurality of slots included in the generated new template; and
accepting an editing operation on the generated layout image(s) from a user;
after the layout image(s) is/are generated, displaying one or a plurality of templates usable to edit the generated layout image(s); and
in a case where the editing operation accepted from the user is intended to change a template used for the generated layout image(s), changing the generated layout image(s) to a layout image or images generated by using a template selected by the user from among the one or plurality of templates displayed,
wherein a plurality of the new templates is generated based on a feature of the one or plurality of pieces of image data specified, and
wherein one or a plurality of templates not used to generate the layout image(s) from among the generated plurality of the new templates is included in the one or plurality of templates usable to edit the generated layout image(s).

17. A non-transitory computer-readable storage medium storing a program configured to cause a computer to perform a control method of an image processing apparatus, the control method comprising:
specifying one or a plurality of pieces of image data;
generating a new template based on a feature of the specified one or plurality of pieces of image data, the generated new template including at least one or a plurality of slots for which the specified one or plurality of pieces of image data are laid out;
generating a layout image by laying out the specified one or plurality of pieces of image data to the one or plurality of slots included in the generated new template; and
accepting an editing operation on the generated layout image(s) from a user;
after the layout image(s) is/are generated, displaying one or a plurality of templates usable to edit the generated layout image(s); and
in a case where the editing operation accepted from the user is intended to change a template used for the generated layout image(s), changing the generated layout image(s) to a layout image or images generated by using a template selected by the user from among the one or plurality of templates displayed,
wherein a plurality of the new templates is generated based on a feature of the one or plurality of pieces of image data specified, and
wherein one or a plurality of templates not used to generate the layout image(s) from among the generated plurality of the new templates is included in the one or plurality of templates usable to edit the generated layout image(s).

* * * * *